United States Patent
Han

(10) Patent No.: US 10,581,854 B2
(45) Date of Patent: Mar. 3, 2020

(54) INFORMATION PROCESSING SYSTEM, INFORMATION PROCESSING APPARATUS, INFORMATION PROCESSING METHOD, AND RECORDING MEDIUM

(71) Applicant: Xiaofeng Han, Kanagawa (JP)

(72) Inventor: Xiaofeng Han, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 356 days.

(21) Appl. No.: 15/262,329

(22) Filed: Sep. 12, 2016

(65) Prior Publication Data

US 2017/0078293 A1 Mar. 16, 2017

(30) Foreign Application Priority Data

Sep. 14, 2015 (JP) .................................. 2015-181257
Jun. 16, 2016 (JP) .................................. 2016-120228

(51) Int. Cl.
*G06F 7/04* (2006.01)
*H04L 29/06* (2006.01)
(Continued)

(52) U.S. Cl.
CPC ................ *H04L 63/10* (2013.01); *G06F 8/61* (2013.01); *G06F 21/105* (2013.01); *H04L 63/08* (2013.01)

(58) Field of Classification Search
CPC ........ G06F 21/12; G06F 21/10; G06F 21/105; G06F 21/608; G06F 2221/0704; G06F 2221/0773; H04L 63/102
(Continued)

(56) References Cited

U.S. PATENT DOCUMENTS 8,863,300 B2 10/2014 Sugiura et al.
9,003,388 B2 4/2015 Han et al.
(Continued)

FOREIGN PATENT DOCUMENTS

EP 2713300 A1 4/2014
JP 2002-351644 12/2002
(Continued)

OTHER PUBLICATIONS

Extended European Search Report dated Jan. 25, 2017.

*Primary Examiner* — Gary S Gracia
(74) *Attorney, Agent, or Firm* — Harness, Dickey & Pierce, P.L.C.

(57) ABSTRACT

An information processing system includes an information processing apparatus, a first server, and one or more second servers configured to manage authority to use different applications. The information processing apparatus includes: a first request information transmitter configured to transmit first request information containing application identifying information that identifies an already-installed application, to the first server; a server specifying information receiver configured to receive server specifying information from the first server as a response to the first request information; a second request information transmitter configured to transmit second request information containing the use authority authentication information corresponding to the already-installed application to a second server that is specified by the server specifying information; a use authority information receiver configured to receive the use authority information from the second server as a response to the second request information.

20 Claims, 24 Drawing Sheets

(51) Int. Cl.
*G06F 8/61* (2018.01)
*G06F 21/10* (2013.01)
*G06F 15/16* (2006.01)

(58) Field of Classification Search
USPC .............................................. 726/27, 28, 29
See application file for complete search history.

(56) References Cited

U.S. PATENT DOCUMENTS

| | | | |
|---|---|---|---|
| 9,063,810 B2 | 6/2015 | Ikawa et al. | |
| 9,274,776 B2 | 3/2016 | Hirokawa et al. | |
| 9,306,923 B2 | 4/2016 | Matsugashita | |
| 2004/0215671 A1 | 10/2004 | Hyakutake et al. | |
| 2006/0168148 A1 | 7/2006 | Hyakutake et al. | |
| 2007/0150534 A1 | 6/2007 | Hyakutake et al. | |
| 2008/0148412 A1* | 6/2008 | Okada | G06F 21/12 726/28 |
| 2008/0209569 A1* | 8/2008 | Araki | G06F 21/105 726/26 |
| 2009/0231353 A1 | 9/2009 | Han | |
| 2009/0241107 A1* | 9/2009 | Kobayashi | G06F 21/10 717/178 |
| 2009/0282146 A1* | 11/2009 | Nakano | G06F 21/105 709/224 |
| 2010/0071069 A1* | 3/2010 | Sugiura | G06F 21/105 726/26 |
| 2010/0325734 A1* | 12/2010 | Etchegoyen | G06F 21/121 726/26 |
| 2010/0328717 A1* | 12/2010 | Sugasaki | H04N 1/00278 358/1.15 |
| 2011/0022377 A1 | 1/2011 | Han et al. | |
| 2011/0061102 A1* | 3/2011 | Aono | G06F 21/105 726/21 |
| 2011/0066721 A1 | 3/2011 | Shinomiya | |
| 2011/0066972 A1* | 3/2011 | Sugiura | G06F 8/61 715/806 |
| 2011/0067023 A1* | 3/2011 | Chiyo | H04N 1/0022 717/177 |
| 2012/0210442 A1* | 8/2012 | Ito | G06F 21/10 726/26 |
| 2012/0257240 A1* | 10/2012 | Yuki | G06F 21/10 358/1.14 |
| 2012/0274968 A1 | 11/2012 | Han | |
| 2013/0010329 A1* | 1/2013 | Yuki | G06F 21/10 358/1.15 |
| 2013/0133085 A1* | 5/2013 | Tsujimoto | G06F 21/6245 726/28 |
| 2013/0219261 A1 | 8/2013 | Han et al. | |
| 2014/0090028 A1 | 3/2014 | Matsugashita | |
| 2014/0281914 A1 | 9/2014 | Sakawaki et al. | |
| 2014/0351945 A1* | 11/2014 | Aso | G06F 21/10 726/26 |
| 2014/0380502 A1 | 12/2014 | Sugiura et al. | |
| 2015/0057990 A1 | 2/2015 | Han et al. | |
| 2015/0082389 A1 | 3/2015 | Han | |
| 2015/0220323 A1 | 8/2015 | Ikawa et al. | |
| 2015/0309996 A1 | 10/2015 | Han | |
| 2016/0217084 A1* | 7/2016 | Eun | G06F 21/35 |
| 2017/0180387 A1* | 6/2017 | Hayashi | H04L 63/102 |
| 2017/0251122 A1* | 8/2017 | Matsushima | H04N 1/4433 |

FOREIGN PATENT DOCUMENTS

| | | |
|---|---|---|
| JP | 2011-065296 | 3/2011 |
| JP | 2013-250997 | 12/2013 |

* cited by examiner installer_install://id=49354

DO YOU INSTALL XXXX (NAME OF APPLICATION TO BE INSTALLED)?

CANCEL  INSTALL

| APPLICATION ID | FILE PATH | URL |
|---|---|---|
| 111111 | xxx.png | http://www.xx.jp |
| 111112 | yyy.png | http://www.yy.jp |
| 111113 | zzz.png | http://www.zz.jp |
| ⋮ | ⋮ | ⋮ |

FIG.10

| ITEM NAME | INFORMATION |
|---|---|
| UNIQUE ID | 123456ABC |
| APPLICATION ID | 111112 |
| LICENSE TYPE | Type: A |
| TERM OF VALIDITY | yyyy/mm/dd |
| DAYS OF VALIDITY | ff days |
| LICENSE KEY | afhdwz1354 |
| DATE OF ISSUE OF LICENSE | wwww/nn/ee |

| APPLICATION ID | URL |
|---|---|
| 111111 | http://www.xx.jp |
| 111112 | http://www.yy.jp |
| 111113 | http://www.zz.jp |
| ⋮ | ⋮ |

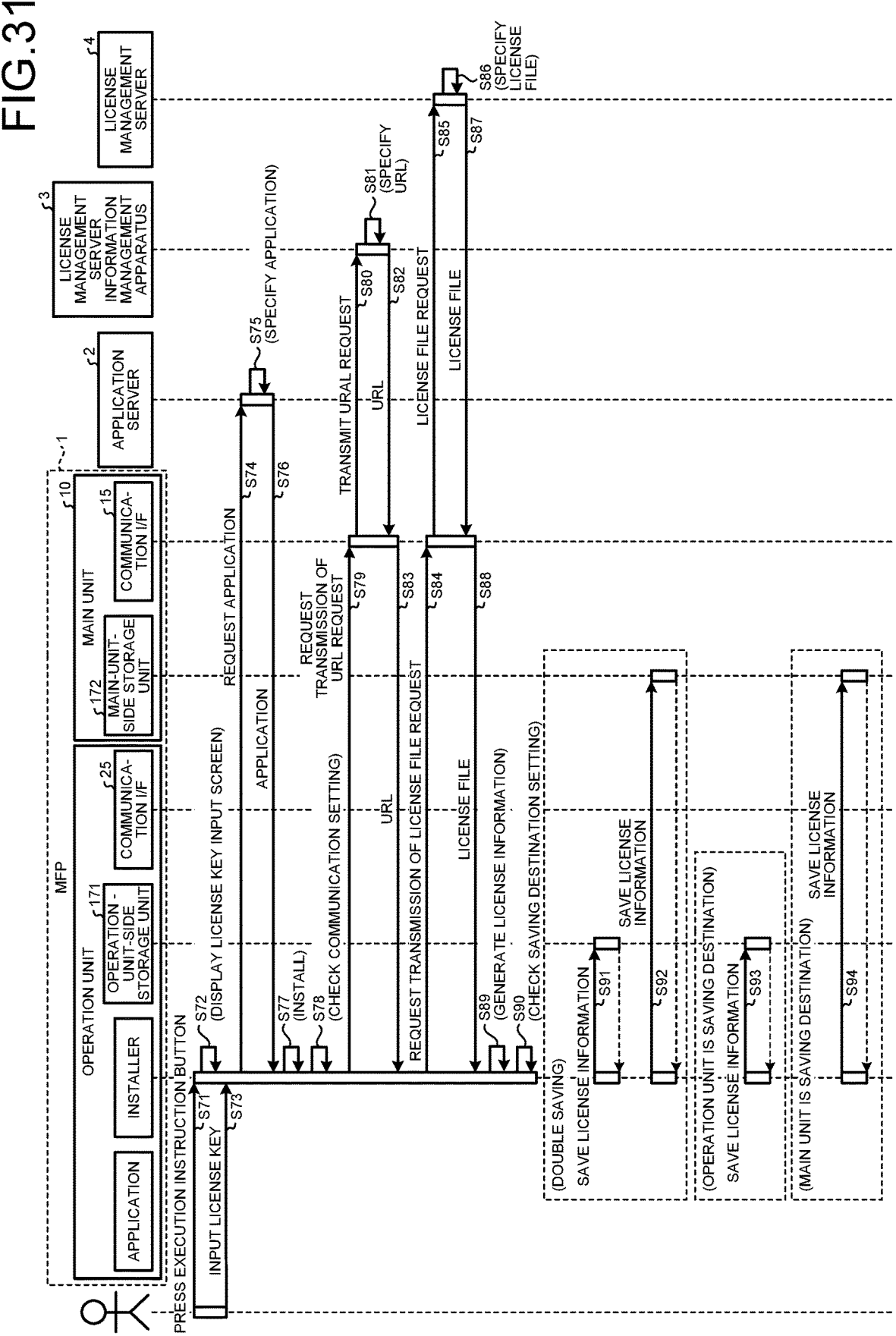

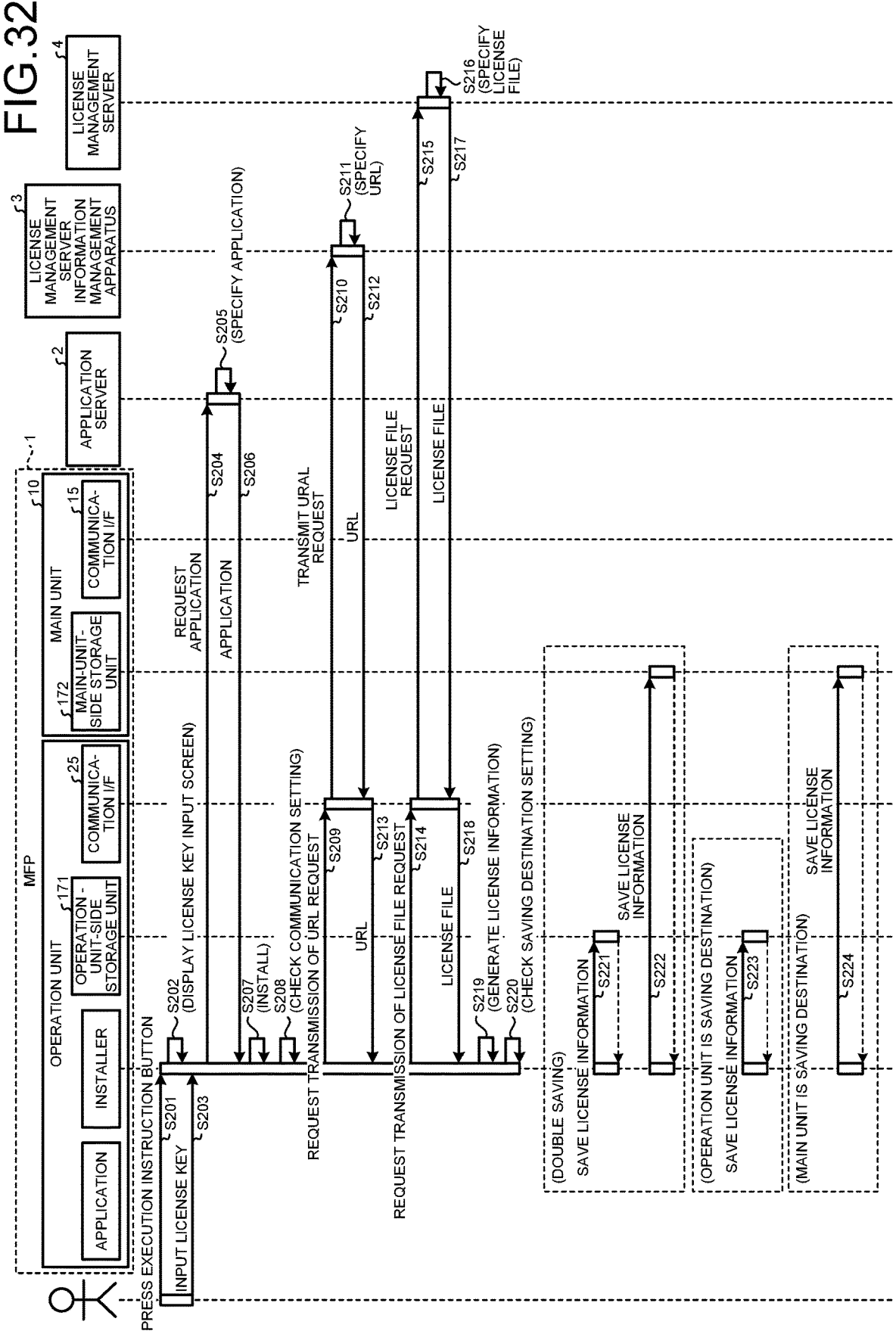

INFORMATION PROCESSING SYSTEM, INFORMATION PROCESSING APPARATUS, INFORMATION PROCESSING METHOD, AND RECORDING MEDIUM

CROSS-REFERENCE TO RELATED APPLICATIONS

The present application claims priority under 35 U.S.C. § 119 to Japanese Patent Application No. 2015-181257, filed Sep. 14, 2015, and Japanese Patent Application No. 2016-120228, filed Jun. 16, 2016. The contents of which are incorporated herein by reference in their entirety.

BACKGROUND OF THE INVENTION

1. Field of the Invention

The present invention relates generally to an information processing system, an information processing apparatus, an information processing method, and a recording medium.

2. Description of the Related Art

A conventional technology for managing information on authority to use an application that is installed in, for example, an image processing apparatus (hereinafter, may be referred to as "license information (use authority information)") is known.

For example, Japanese Unexamined Patent Application Publication No. 2013-250997 discloses a configuration in which an MFP manages license data containing at least the application ID of an application and an expiry date (exemplary license information) and, in a case where the current time is over the expiry date when the application is started, performs control to update the license information on the application. With respect to the technology disclosed in Japanese Unexamined Patent Application Publication No. 2013-250997, the license information on the application that is used by the MFP is issued by a predetermined license management server and the MFP communicates with the license server to update the license information (such as the expiry date).

In recent years, there are many cases where an application for which authority to use the application is determined by license information that is uniquely defined by a vender different from a maker that manufactures the main unit of a MFP is installed in the MFP and used. Japanese Unexamined Patent Application Publication No. 2013-250997 however does not disclose a configuration for, in a case where an MFP uses an application for which authority to use the application is determined by license information that is issued by a server different from a license management server, acquiring and managing the license information. In other words, there is a problem that, when the sources of issue of pieces of license information on multiple applications that are installed in an information processing apparatus, such as an MFP, differ from one another, it is not possible to manage the pieces of license information collectively.

SUMMARY OF THE INVENTION

According to one aspect of the present invention, an information processing system includes an information processing apparatus, a first server, and one or more second servers configured to manage authority to use different applications. The information processing apparatus, the first server, and the one or more second servers are connected to one another via a network. The first server includes a first storage unit, a first request information receiver, and a server specifying information transmitter. The first storage unit is configured to store first correspondence information in which application identifying information that identifies an application and server specifying information that specifies a second server are associated with each other. The first request information receiver is configured to receive first request information that contains the application identifying information and that requests the server specifying information, from the information processing apparatus. The server specifying information transmitter is configured to transmit the server specifying information that is associated with the application identifying information contained in the first request information received by the first request information receiver, to the information processing apparatus. The second server includes a second storage unit, a second request information receiver, and a use authority information transmitter. The second storage unit is configured to store one or more pieces of use authority information that each contain use authority authentication information for authenticating the use authority and that represents information on the use authority. The second request information receiver is configured to receive second request information that contains the use authority authentication information and that requests the use authority information containing the use authority authentication information, from the information processing apparatus. The use authority information transmitter is configured to transmit the use authority information that contains the use authority authentication information contained in the second request information received by the second request information receiver, to the information processing apparatus. The information processing apparatus includes a first request information transmitter, a server specifying information receiver, a second request information transmitter, a use authority information receiver, and a third storage unit. The first request information transmitter is configured to transmit the first request information containing the application identifying information that identifies the already-installed application, to the first server. The server specifying information receiver is configured to receive the server specifying information from the first server as a response to the first request information. The second request information transmitter is configured to transmit the second request information containing the use authority authentication information corresponding to the already-installed application to the second server that is specified by the server specifying information received by the server specifying information receiver. The use authority information receiver is configured to receive the use authority information from the second server as a response to the second request information. The third storage unit is configured to store second correspondence information in which the application identifying information that identifies the already-installed application and the use authority information received by the use authority information receiver are associated with each other.

BRIEF DESCRIPTION OF THE DRAWINGS

FIG. 9 is a table of exemplary license information;

FIG. 10 is a table of an exemplary license file;

FIG. 31 is a sequence chart of an exemplary procedure of operations of an information processing system of the modification; and FIG. 32 is a sequence chart of an exemplary procedure of operations of the information processing system of the modification.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
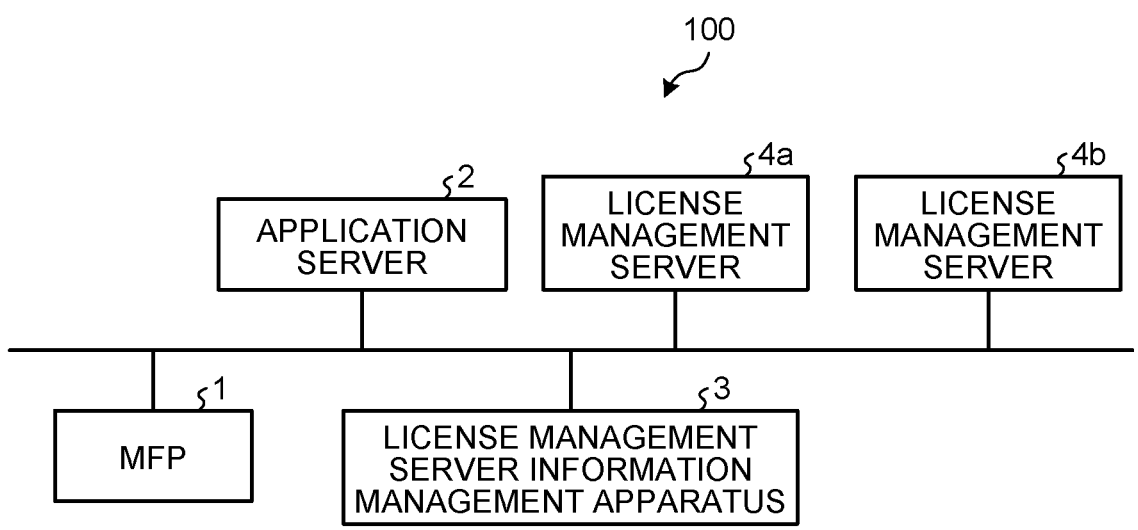
FIG. 1 is a diagram of an exemplary schematic configuration of an information processing system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An information processing system, an information processing apparatus, an information processing method, and a recording medium according to an embodiment of the present invention will be described in detail below with reference to the accompanying drawings. A multifunction peripheral (MFP) that is one mode of an image forming apparatus will be exemplified below as the information processing apparatus according to the embodiment; however, the information processing apparatus is not limited thereto. A MFP is an apparatus including multiple different functions, such as a copy function, a scanner function, a printer function, and a FAX function.

An embodiment has an object to provide an information processing system, an information processing apparatus, an information processing method, and a recording medium that, even when the sources of issue of pieces of license information on multiple applications that are installed in an information processing apparatus differ from one another, enable collective management of the pieces of license information.

FIG. 1 is a diagram of an exemplary configuration of an information processing system 100 of an embodiment of the present invention. As illustrated in FIG. 1, the information processing system 100 includes a MFP 1, an application server 2, a license management server information management apparatus 3, a license management server 4a, and a license management server 4b that are mutually connected via a network 8, such as the Internet.

The application server 2 is an exemplary "third server" that provides a list of applications usable by the MFP 1 to the MFP 1. More specifically, the application server 2 provides, to the MFP 1, an application list screen in which each of one or more applications is associated with an installation command representing a command to install the application in the MFP. The specific content thereof will be described below.

The license management server information management apparatus 3 is an exemplary "first server". The license management server information management apparatus 3 manages, with respect to each of multiple applications, server specifying information ("URL" is exemplified here) that specifies a second server that issues a license file that is exemplary use authority information on authority to use the application. The license file contains a license key that is exemplary use authority authentication information for authenticating the license (determine whether valid authority is given). The more specific content will be described below.

Each of the license management servers 4a and 4b is an exemplary "second server". The license management servers 4a and 4b manage authority to use applications different from each other. In this example, the license management server 4a manages a license file that is defined by a maker that manufactures the MFP 1 and the license management server 4b manages a license file that is defined by a vender. The more specific content thereof will be described below. In the following descriptions, when the license management servers 4a and 4b are not distinguished from each other, the license management servers 4a and 4b may be referred to simply as a "license management server 4".

In this example, an application that provides a function of acquiring the application list screen from the application server 2 and displaying the application list screen on the MFP 1 (which may be referred to as a "browser application" below) and an application that provides a function of installing, in the MFP 1, an application chosen by a user from the applications displayed on the application list screen and a function of managing a license file of the already-installed application (which may be referred to as an "installer" below) are installed in the MFP 1 in advance.

In the example illustrated in FIG. 1, the single MFP 1 is exemplified as the information processing apparatus that the information processing system 100 includes; however, the information processing system 100 is not limited thereto. The information processing system 100 may include any number and any type of information processing apparatuses.

Figure 2:
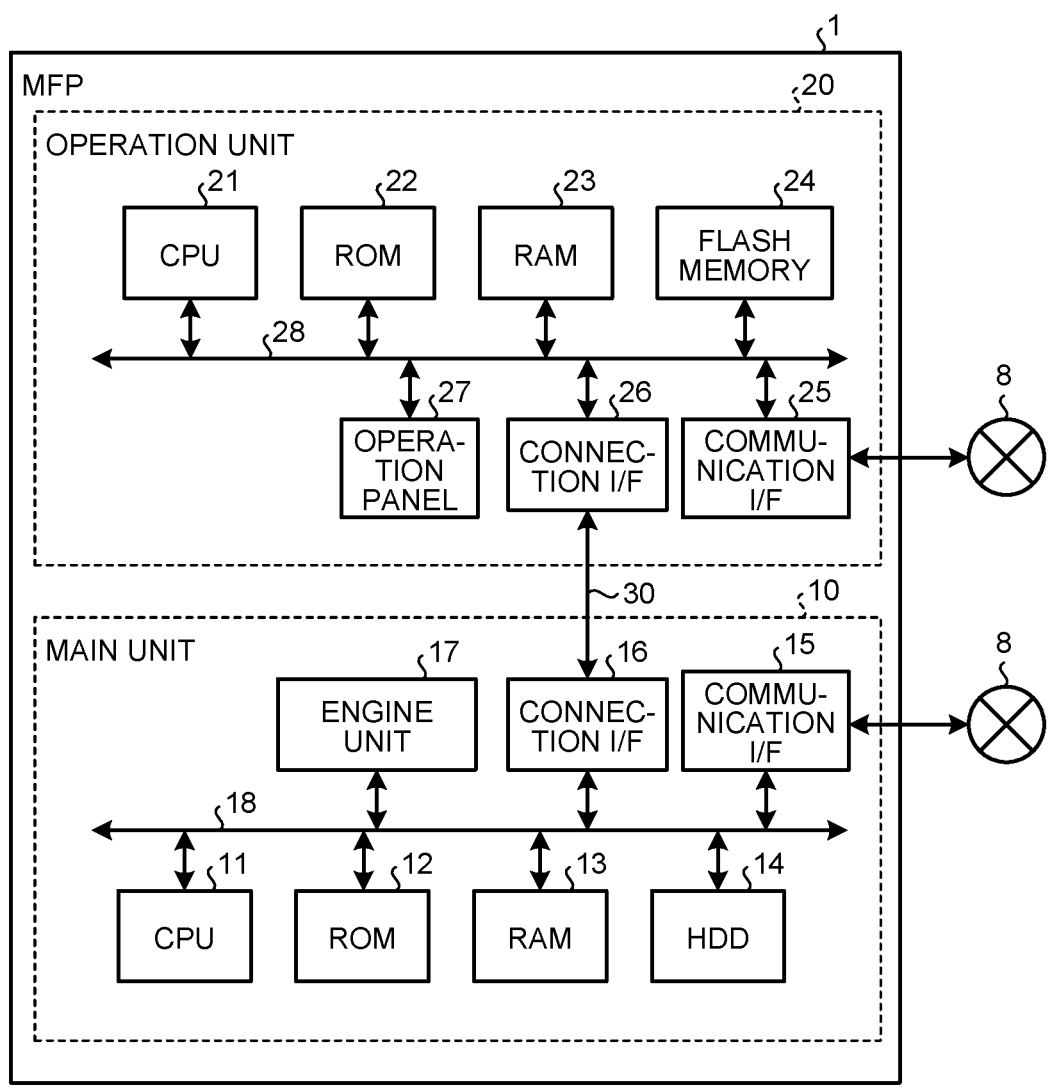
FIG. 2 is a diagram of an exemplary hardware configuration of a MFP.

The hardware configuration of the MFP 1 will be described with reference to FIG. 2 here. As illustrated in FIG. 2, the MFP 1 includes a main unit 10 capable of implementing various functions, such as the copy function, the scanner function, the FAX function, and the printer function, and an operation unit 20 that accepts operations of the user. Note that acceptance of an operation of the user is an idea including acceptance of information that is input in accordance with a user operation (including, for example, a signal representing the coordinate values of the screen). The main unit 10 and the operation unit 20 are communicably connected to each other via a dedicated communication path 30. A communication path according to the universal serial bus (USB) standard may be used as the communication path 30. Alternatively, a communication path according to any standard may be used regardless whether the communication path is wired or wireless.

The main unit 10 is able to operate in accordance with the operation that is accepted by the operation unit 20. The main unit 10 is also communicable with an external device, such as a client PC (personal computer), and is able to operate in accordance with an instruction that is received from the external device.

The hardware configuration of the main unit 10 will be described here. As illustrated in FIG. 2, the main unit 10 includes a CPU 11, a ROM 12, a RAM 13, a hard disk drive (HDD) 14, a communication interface (I/F) 15, a connection I/F 16, and an engine unit 17 that are connected with one another via a system bus 18.

The CPU 11 controls operations of the main unit 10 collectively. The CPU 11 uses the RAM 13 as a work area and executes a program that is stored in the ROM 12 or the HDD 14, thereby controlling entire operations of the main unit 10 and implementing the various functions, such as the copy function, the scanner function, the FAX function, and the printer function.

The communication I/F 15 is an interface for a connection to the network 8. The connection I/F 16 is an interface for communications with the operation unit 20 via the communication path 30.

The engine unit 17 is hardware for performing processes, excluding general-purpose information processing and communications, for implementing the copy function, the scanner function, the FAX function, and the printer function. For example, the engine unit 17 includes a scanner (image reading unit) that scans and reads an image of an original, a plotter (image forming unit) that performs printing on a sheet material, such as paper, and a FAX unit that performs FAX communications. The engine unit 17 may further include specific options, such as a finisher that sorts printed sheet materials or an auto document feeder (ADF) that automatically feeds originals.

The hardware configuration of the operation unit 20 will be described here. As illustrated in FIG. 2, the operation unit 20 includes a CPU 21, a ROM 22, a RAM 23, a flash memory 24, a communication I/F 25, a connection I/F 26, and an operation panel 27 that are mutually connected via a system bus 28.

The CPU 21 controls operations of the operation unit 20 collectively. The CPU 21 uses the RAM 23 as a work area and executes a program that is stored in, for example, the ROM 22 or the flash memory 24 to control entire operations of the operation unit 20 and implements various functions of, for example, displaying information (image) corresponding to an input accepted from the user, which will be described below.

The communication I/F 25 is an interface for a connection to the network 8. The connection I/F 26 is an interface for communications with the main unit 10 via the communication path 30.

The operation panel 27 accepts various inputs according to operations of the user and displays various types of information (such as information corresponding to the accepted operation, information representing the operating state of the MFP 1, and information representing the setting state). In this example, the operation panel 27 includes a liquid display device (LCD) having a touch panel function; however, the operation panel 27 is not limited thereto. For example, the operation panel 27 may include an organic EL display device having the touch panel function. In addition thereto or instead thereof, an operation unit, such as a hardware key, or a display unit, such as a lamp, may be provided.

Figure 3:
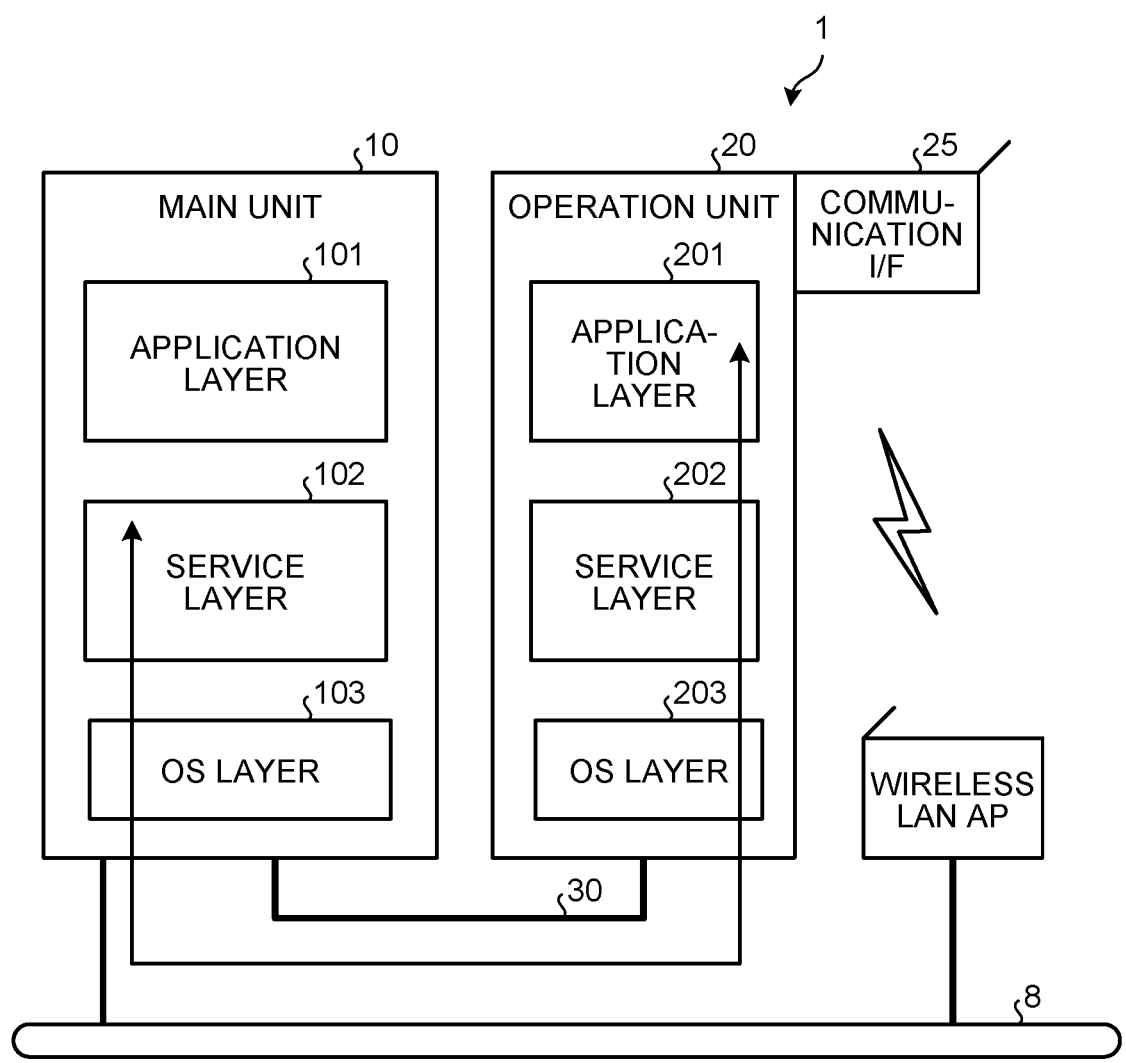
FIG. 3 is a diagram of an exemplary software configuration of the MFP.

The software configuration of the MFP 1 will be described. FIG. 3 is a schematic diagram of an exemplary software configuration of the MFP 1. As illustrated in FIG. 3, the main unit 10 includes an application layer 101, a service layer 102, and an OS layer 103. The entity of the application layer 101, the service layer 102, and the OS layer 103 is various types of software that are stored in, for example, the ROM 12 or the HDD 14. The CPU 11 executes the various types of software to provide various functions.

The software of the application layer 101 is application software (which may be refereed simply as "applications" below) for causing hardware resources to operate to provide given functions. For example, there are, as applications, a copy application for providing the copy function, a scanner application for providing the scanner function, a FAX application for providing a FAX function, and a printer application for providing the printer function.

The software of the service layer 102 is between the application layer 101 and the OS layer 103. The software of the service layer 102 is software that provides an interface for using the hardware resources of the main unit 10 to the applications. More specifically, the software of the service layer 102 is software for providing a function of accepting operation requests to hardware resources and adjusting the operation requests. The operation requests accepted by the service layer 102 are, for example, a request for the scanner to perform reading and a request for the plotter to perform printing.

The interface function provided by the service layer 102 is provided not only to the application layer 101 of the main unit 10 but also to an application layer 201 of the operation unit 20. In other words, the application layer 201 (application) of the operation unit 20 is also able to implement the functions using the hardware resources (for example, the engine unit 17) of the main unit 10 via the interface function of the service layer 102.

The software of the OS layer 103 is basic software (an operating system (OS)) for providing basic functions for controlling the hardware of the main unit 10. The software of the service layer 102 converts requests to use hardware resources from various applications into commands interpretable by the OS layer 103 and then passes the commands to the OS layer 103. The software of the OS layer 103 executes the commands and accordingly the hardware resources operate according to the requests from the applications.

As the main unit 10 does, the operation unit 20 includes the application layer 201, a service layer 202, and an OS layer 203. The application layer 201, the service layer 202, and the OS layer 203 of the operation unit 20 have the same layer structure as the main unit 10. Note that the function provided by the application of the application layer 201 and the types of operation requests acceptable by the service layer 202 are different from the main unit 10. The application of the application layer 201 may be software for causing the hardware resources of the operation unit 20 to operate to provide a given function, and is software mainly for providing the function of a user interface (UI) for performing operations and making displays, which are operations and displays relating to the functions of the main unit 10 (the copy function, the scanner function, the FAX function, and the printer function) and a function of updating the license file of an already-installed application. In this example, the application of the application layer includes the browser application and the installer.

In the present embodiment, in order to maintain independency between the functions, the software of the OS layer 103 of the main unit 10 and the software of the OS layer 203 of the operation unit 20 are different from each other. In other words, the main unit 10 and the operation unit 20 operate independently on different operating systems. For example, Linux (Trademark) may be used as the software of the OS layer 103 of the main unit 10 and Android (Trademark) may be used as the software of the OS layer 203 of the operation unit 20.

In the MFP 1 of the present embodiment, the main unit 10 and the operation unit 20 operate using the different operating systems and accordingly communications between the main unit 10 and the operation unit 20 are performed not between processes in a common device but between different devices. The communications correspond to, for example, an operation (command communication) performed by the operation unit 20 to transmit accepted information (the content of an instruction from the user) to the main unit 10 and an operation performed by the main unit 10 to notify the operation unit 20 of an event. Here, the operation unit 20 communicates a command to the main unit 10, which enables the use of the function of the main unit 10. The event notified to the operation unit 20 by the main unit 10 is, for example, the operation execution condition in the main unit 10 and the content of a setting set in the main unit 10.

In the present embodiment, because power is supplied to the operation unit 20 from the main unit 10 via the communication path 30, it is possible to perform the power supply control on the operation unit 20 differently from (independently of) power control on the main unit 10.

Figure 4:
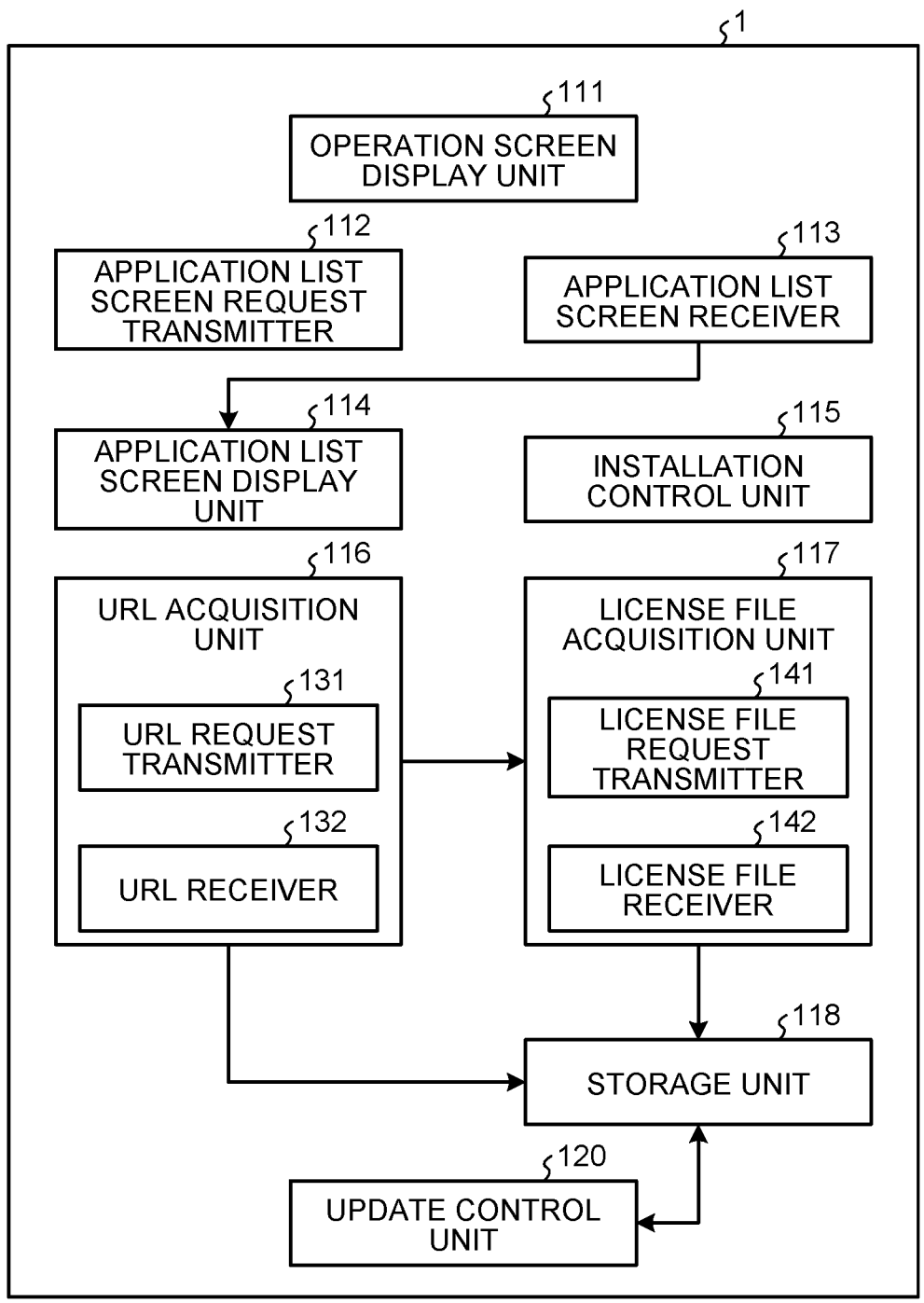
FIG. 4 is a diagram of exemplary functions of the MFP.

The functions of the MFP 1 will be described here. FIG. 4 is a diagram of exemplary functions of the MFP 1. As illustrated in FIG. 4, the MFP includes an operation screen display unit 111, an application list screen request transmitter 112, an application list screen receiver 113, an application list screen display unit 114, an installation control unit 115, a URL acquisition unit 116, a license file acquisition unit 117, a storage unit 118, and an update control unit 120. FIG. 4 mainly exemplifies the functions that relate to the present embodiment for convenience of descriptions; however, functions of the MFP 1 are not limited thereto.

Figure 5:
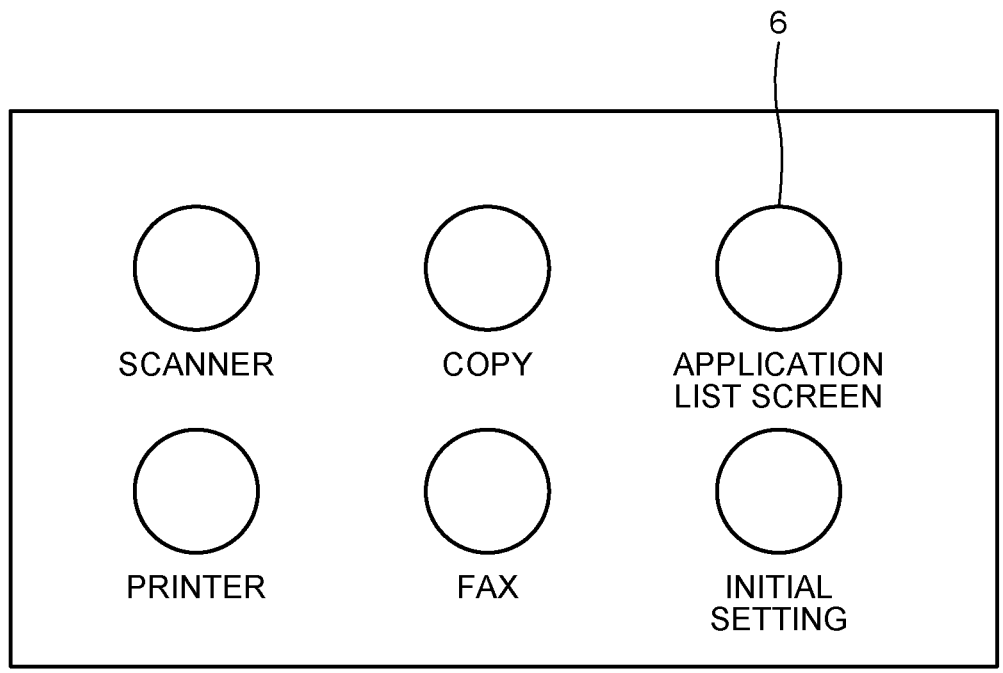
FIG. 5 is a diagram of an exemplary operation screen.

The operation screen display unit 111 performs control to display an operation screen for performing various operations on the operation panel 27. FIG. 5 is a diagram of an exemplary operation screen on which an icon 6 for starting the browser application for acquiring an application list screen and displaying the application list screen on the MFP 1 is displayed.

The description of FIG. 4 will be continued. The application list screen request transmitter 112 transmits an application list screen request that requests an application list screen to the application server 2. The application list screen receiver 113 receives the application list screen from the application server 2.

In the present embodiment, when the user touches the icon 6, the browser application (the application list screen request transmitter 112) transmits an application list screen request to the application server 2. The browser application (the application list screen receiver 113) receives an application list screen from the application server 2 as a response to the application list screen request.

Figure 6:
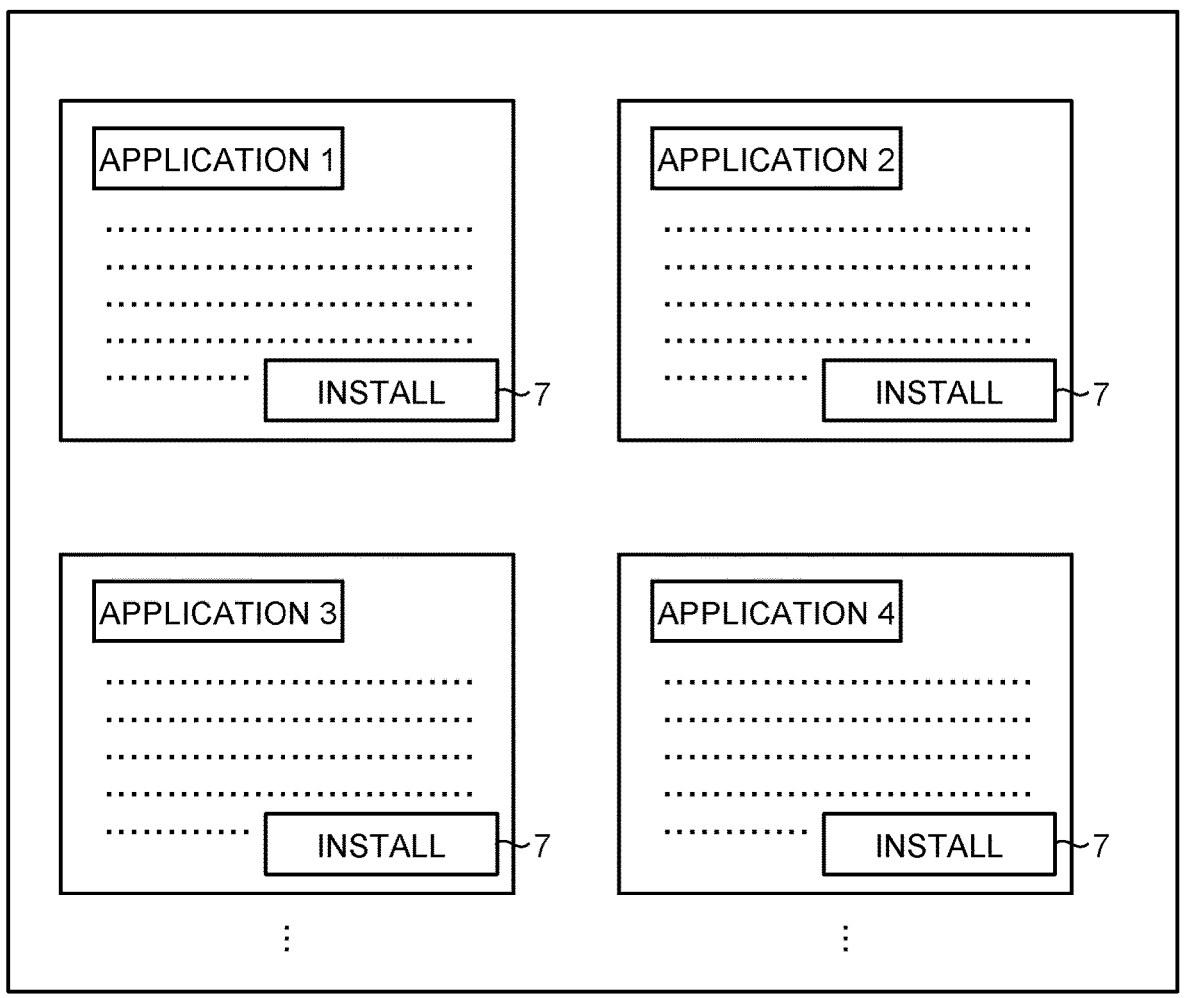
FIG. 6 is a diagram of exemplary application list screen.

FIG. 6 is a diagram of an exemplary application list screen. In the example illustrated in FIG. 6, the application list screen displays, with respect to each of multiple applications, explanation information illustrating the content of the application and a button 7 for issuing an instruction to install the application (in this example, the button 7 for issuing an instruction to install the application, which will be referred to as "installation button 7"). In this example, a command for the installer to install the application (which will be referred to as "installation command" below) is attached in a form of URI (for example, in a form of URL) to the installation button 7 corresponding to the application. In this example, pressing the installation button 7 means a choice the installation command that is attached to the installation button 7 (which may be considered as a choice of an application required to be installed).

Figures 7, 8:
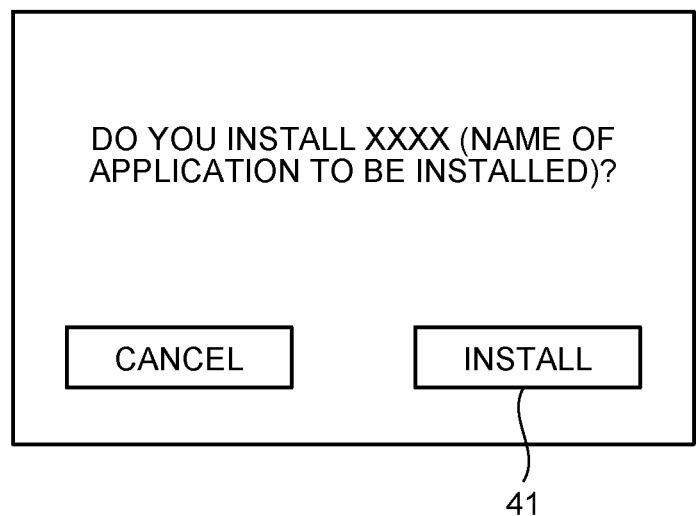
FIG. 7 is a diagram of an exemplary installation command.
FIG. 8 is a diagram of an exemplary installation screen.

FIG. 7 is a diagram of an exemplary installation command that is attached to the installation button 7 corresponding to the application that is identified by an application ID "49354". FIG. 7 represents a command to install the application that is identified by the application ID "49354".

The description of FIG. 4 will be continued. The application list screen display unit 114 performs control to display the application list screen that is received from the application list screen receiver 113. In this example, the application list screen display unit 114 performs control to display the application list screen that is received by the application list screen receiver 113 on the operation panel 27.

The installation control unit 115 performs control to install an application that is chosen by the user from among the applications contained in the application list screen. More specifically, the installation control unit 115 transmits an application request requesting an application corresponding to the installation command attached to the installation button 7 that is pressed by the user (which is considered as the application that is chosen by the user from among the applications contained in the application list screen). The installation control unit 115 then receives the application from the application server 2 as a response to the application request and performs control to install the received application in the MFP 1.

For example, once the user presses the button 7 of any one of the applications on the application list screen, the browser application notifies the OS of the operation unit 20 of the installation command attached to the installation button 7. The OS of the operation unit 20 checks the notified installation command and broadcasts the installation command to each application of the operation unit 20. In response to the broadcasted installation command, the installer executes the installation command. For example, when the installation command is in the mode illustrated in FIG. 7, first of all, the installer displays an installation screen, as illustrated in FIG. 8, for issuing an instruction to execute installation. On the installation screen illustrated in FIG. 8, at least an execution instruction button 41 for issuing an instruction to execute installation of the application to be installed (in this example, the application identified by the application ID "49354") is displayed. Once the user presses the execution instruction button 41, the installer transmits an application request requesting the application identified by the application ID "49354" to the application server 2 and receives the application from the application server 2. In this example, the application request contains at least the application ID that identifies the requested application. The installer performs control to install, in the MFP 1, the application that is received (downloaded) from the application server 2 as the response to the application request.

The description of FIG. 4 will be continued. The URL acquisition unit 116 acquires the URL (exemplary "use authority information") that specified the license management server 4 that issues a license file of the application installed by the installation control unit 115. In the example illustrated in FIG. 4, the URL acquisition unit 116 includes an URL request transmitter 131 and a URL receiver 132.

The URL request transmitter 131 is an exemplary "first request information transmitter". The URL request transmitter 131 transmits a URL request (exemplary "first request information") that contains the application ID identifying the already-installed application (exemplary "application identifying information") and that requests the URL of the license management server 4 that issues the license file of the application that is identified by the application ID, to the license management server information management apparatus 3 (exemplary "first server").

The URL receiver 132 is an exemplary "server specifying information receiver". The URL receiver 132 receives the URL as a response to the URL request from the license management server information management apparatus 3.

The description of FIG. 4 will be continued. The license file acquisition unit 117 acquires the license file of the already-installed application from the license management server 4 that is specified by the URL acquired by the URL acquisition unit 116. In the example illustrated in FIG. 4, the license file acquisition unit 117 includes a license file request transmitter 141 and a license file receiver 142.

The license file request transmitter 141 is an exemplary "second request information transmitter". The license file request transmitter 141 transmits a license file request ("second request information") requesting a license file (exemplary "use authority information") containing a license key (exemplary "use authority authentication information") corresponding to the already-installed application (the application identified by the application ID contained in the URL request), to the license management server 4 that is specified by the URL received by the URL receiver 132.

The license file receiver 142 is an exemplary "use authority information receiver". The license file receiver 142 receives the license file as a response to the license file request from the license management server 4.

The description of FIG. 4 will be continued. The storage unit 118 is an exemplary "third storage unit". The storage unit 118 stores the license information (exemplary "second correspondence information") in which the application ID that identifies the already-installed application and the license file received by the license file receiver 142 are associated with each other. In this example, the storage unit 118 stores the license information in which the application ID that identifies the already-installed application, the license file that is received by the license file receiver 142, and the URL that is received by the URL receiver 132 are associated with one another. FIG. 9 is a diagram of exemplary license information. In the example illustrated in FIG. 9, the license information is information in which an application ID, a file path representing the location in which the license file is stored, and a URL are associated with one another; however, the form of license information may be changed to any mode. In this example, when there are multiple already-installed applications, multiple pieces of license information corresponding to the multiple applications, respectively, are stored in the storage unit 118.

FIG. 10 is a diagram of an exemplary license file. In the example illustrated in FIG. 10, the license file is an assembly of data sets each consisting of an item name and the corresponding information. In the example illustrated in FIG. 10, "unique ID" that uniquely identifies an issued license, "application ID" that identifies a subject application, "license type" representing the type of license, "term of validity" representing the term during which it is possible to use the subject application, "days of validity" representing the number of dates during which it is possible to use the subject application, and "license key" for authenticating the license are exemplified as item names; however, the item names are not limited thereto. Note that it is possible to change the item names contained in the license file to any item names according to the type of license. In this example, the license file contains at least validity-term information representing the term during which it is possible to use the subject application. In the example illustrated in FIG. 10, a data set consisting of the item name "term of validity" and the corresponding information correspond to "validity-term information". Note that the use authority information (such as, the license file) is an assembly of pieces of information on authority to use each application, and it is possible to rephrase the use authority information as additional information on the application, authority information, and correspondence information. Furthermore, the use authority authentication information (such as a license key) is information serving as a key used to authenticate or check the authority to use the application. The use authority authentication information may be also referred to as authentication information, use authority determination information, and an authentication key with respect to the application.

Figure 11:
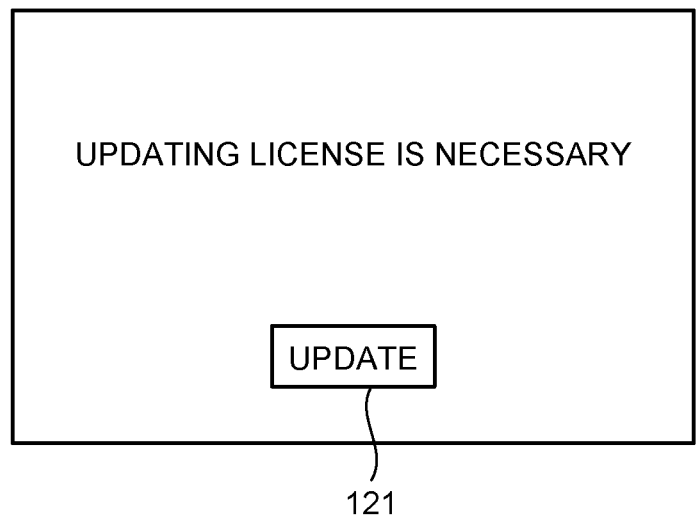
FIG. 11 is a diagram of an exemplary license update screen.

FIG. 4 will be referred back to continue the description. When the time point at which the already-installed application is started is out of the term represented by the validity-term information contained in the license file associated with the application ID of the application, the update control unit 120 performs control to update the license file. More specifically, when the already-installed application is started, the update control unit 120 specifies the license file that is associated with the application ID of the application among the license files stored in the storage unit 118 and checks whether the current time (corresponding to the time at which the application is started) is out of the term represented by the validity-term information. When the current time is out of the term represented by the validity-term information, the update control unit 120 performs control to display a license update screen (exemplary "first screen") on which an instruction to update the license file is accepted. FIG. 11 is a diagram of an exemplary license update screen. In the example illustrated in FIG. 11, an update button 121 for accepting an instruction to update the license file is displayed on the license update screen.

Figure 12:
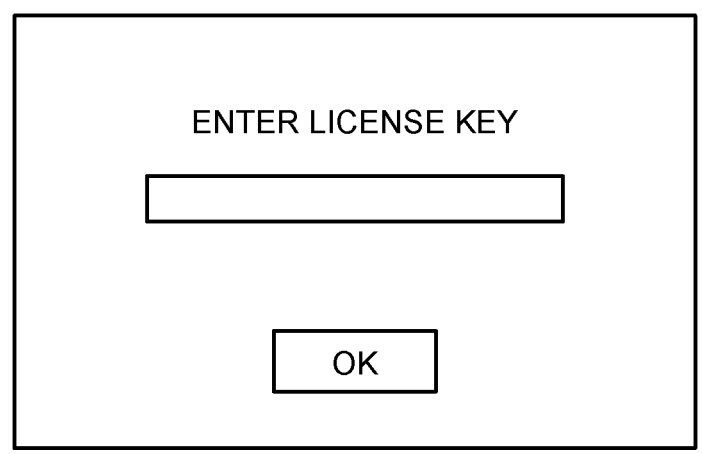
FIG. 12 is a diagram of an exemplary license key input screen.

When an instruction to update the license file is accepted on the license update screen (when an operation of pressing the update button 121 is accepted in this example), the update control unit 120 performs control to display a license key input screen (an exemplary "second screen") on which an input of a license key. FIG. 12 is a diagram of an exemplary license key input screen. Upon accepting an input of a license key on the license key input screen, the update control unit 120 transmits a license file update request (exemplary "third request information") that contains the accepted license key and that requests an update of the license file to the license management server (the license management server 4 that issues the license file). It is possible to specify The URL of the license management server 4 by referring to the above-described license information. The update control unit 120 then updates the license file to be updated, which is stored in the storage unit 118, as a response to the license file update request to the license file that is received from the license management server 4.

The above-described functions (the operation screen display unit 111, the application list screen request transmitter 112, the application list screen receiver 113, the application list screen display unit 114, the installation control unit 115, the URL acquisition unit 116, the license file acquisition unit 117, and the update control unit 120) of the MFP 1 are implemented by the CPU (11 or 21) executing programs stored in a storage device (such as the ROM 12, the HDD 114, the ROM 22, or the flash memory 24). Alternatively, at least part of the functions of the MFP 1 may be implemented with a dedicated hardware circuit (such as a semiconductor integrated circuit). It is possible to implement the storage unit 118 with, for example, the ROM 12, the HDD 14, the ROM 22, or the flash memory 24.

Figure 13:
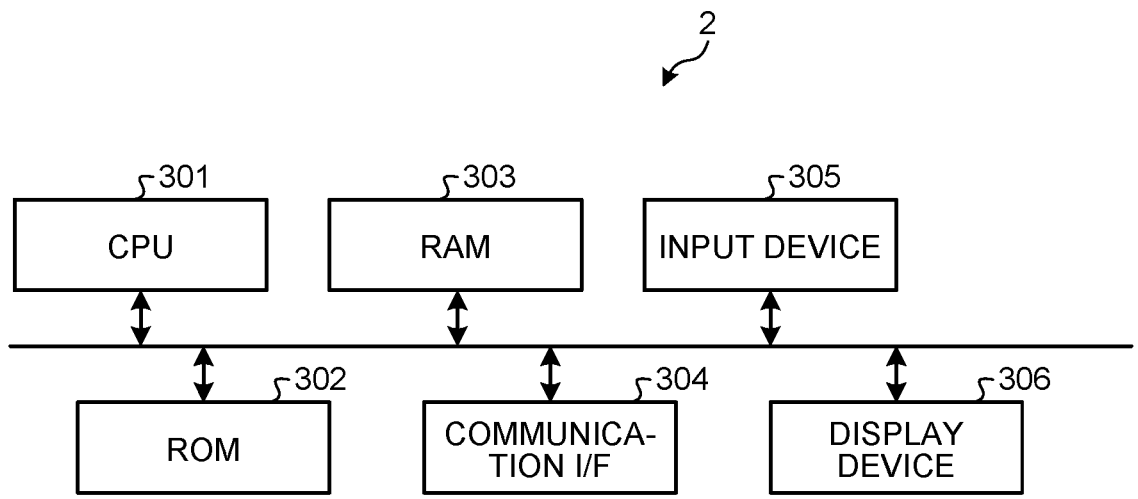
FIG. 13 is a diagram of an exemplary hardware configuration of an application server.

The configuration of the application server 2 will be described here. FIG. 13 is a diagram of an exemplary hardware configuration of the application server 2. As illustrated in FIG. 13, the application server 2 includes a CPU 301, a ROM 302, a RAM 303, a communication I/F 304, an input device 305, and a display device 306. The CPU 301 controls operations of the application server 2 collectively. The ROM 302 is a no-volatile memory that stores various types of data, such as programs. The RAM 303 is a volatile memory that functions as a work area for various processes that are executed by the CPU 301. The communication I/F 304 is an interface for a connection to the network 8. The input device 305 is a device that is used by a user to input an operation. The input device 305 includes, for example, a mouse and a keyboard. The display device 306 is a device that displays various types of information. The display device 306 includes, for example, a liquid crystal display device. In this example, other servers (the license management server information management apparatus 3 and the license management server 4) have the same configuration as illustrated in FIG. 13.

Figure 14:
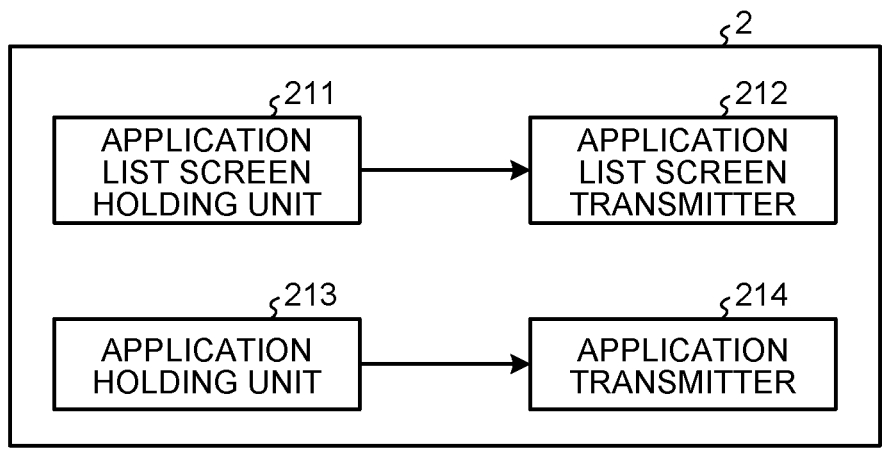
FIG. 14 is a diagram of exemplary functions of the application server.

FIG. 14 is a diagram of exemplary functions of the application server 2. As illustrated in FIG. 14, the application server 2 includes an application list screen holding unit 211, an application list screen transmitter 212, an application holding unit 213, and an application transmitter 214. FIG. 14 mainly exemplifies the functions that relate to the present embodiment for convenience of descriptions; however, functions of the application server 2 are not limited thereto.

The application list screen holding unit 211 holds an application list screen. The application list screen transmitter 212 transmits the application list screen as a response to the application list screen request from the MFP 1.

The application holding unit 213 holds multiple applications. The multiple applications held by the application holding unit 213 include at least the applications that are displayed on the application list screen.

The application transmitter 214 transmits any one of the multiple applications that are held by the application holding unit 213, to the MFP 1 as a response to the application list screen request from the MFP 1. More specifically, the application transmitter 214 specifies the application that is identified by the application ID contained in the application request among the applications held by the application holding unit 213 and transmits the specified application to the MFP 1.

The above-described functions (the application list screen transmitter 212 and the application transmitter 214) of the application server 2 are implemented by the CPU 301 of the application server 2 executing programs stored in, for example, the ROM 302. Alternatively, for example, part of the functions of the application server 2 may be implemented with a dedicated hardware circuit (for example, a semiconductor integrated circuit). The application list screen holding unit 211 and the application holding unit 213 may be implemented with, for example, the ROM 302.

Figures 15, 16:
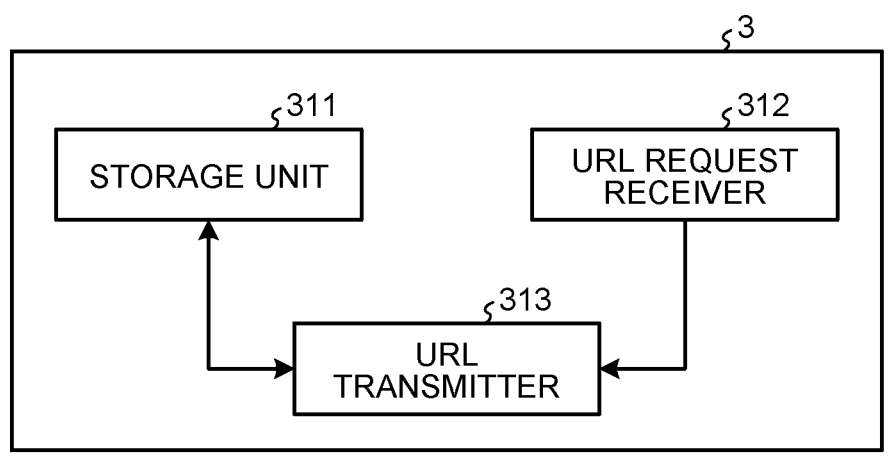
FIG. 15 is a diagram of exemplary functions of a license management server information management apparatus.
FIG. 16 is a table of exemplary URL information.

The configuration of the license management server information management apparatus 3 will be described here. FIG. 15 is a diagram of exemplary functions of the license management server information management apparatus 3. As illustrated in FIG. 15, the license management server information management apparatus 3 includes a storage unit 311, a URL request receiver 312, and a URL transmitter 313.

The storage unit 311 is an exemplary "first storage unit". The storage unit 311 stores URL information (exemplary "first correspondence information") in which an application ID and the URL of the license management server 4 that issues the license file of the application identified by the application ID are associated with each other. FIG. 16 is a diagram of exemplary URL information. When there are multiple applications, multiple pieces of URL information corresponding to the multiple applications, respectively, are stored in the storage unit 311.

The URL request receiver 312 is an exemplary "first request information receiver". The URL request receiver 312 receives the above-described URL request from the MFP 1.

The URL transmitter 313 is an exemplary "server specifying information transmitter". The URL transmitter 313 transits, to the MFP 1, the URL that is associated with the application ID contained in the URL request that is received by the URL request receiver 312. More specifically, the URL transmitter 313 refers to the URL information that is stored in the storage unit 311 and specifies the URL associated with the application ID contained in the URL request received by the URL request receiver 312. The URL transmitter 313 then transmits the specified URL as a response to the URL request to the MFP 1.

The functions (such as the URL request receiver 312 and the URL transmitter 313) of the license management server information management apparatus 3 are implemented by the CPU 301 of the license management server information management apparatus 3 executing programs that are stored in, for example, the ROM 302. Alternatively, at least part of the functions of the license management server information management apparatus 3 may be implemented with a dedicated hardware circuit (such as a semiconductor integrated circuit). Alternatively, the storage unit 311 may be implemented with, for example, the ROM 302.

Figure 17:
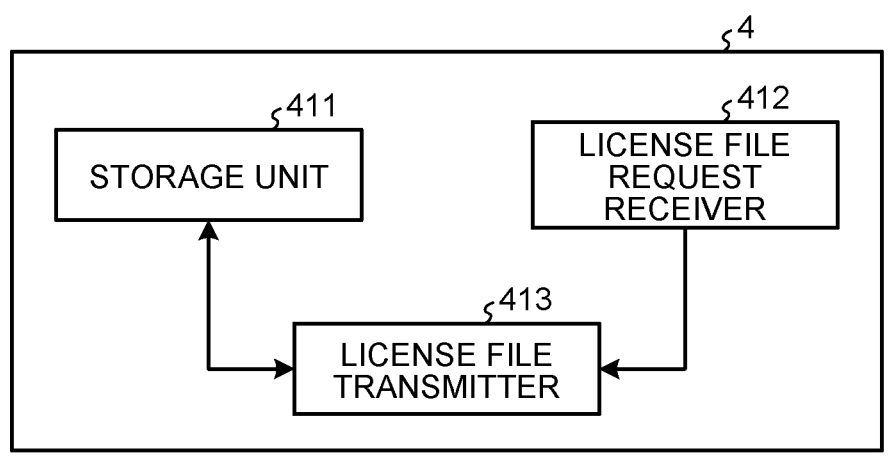
FIG. 17 is a diagram of exemplary functions of the license management server.

The configuration of the license management server 4 will be described here. FIG. 17 is a diagram of exemplary functions of the license management server 4. As illustrated in FIG. 17, the license management server 4 includes a storage unit 411, a license file request receiver 412, and a license file transmitter 413. FIG. 17 mainly exemplifies the functions that relate to the present embodiment for convenience of descriptions; however, functions of the license management server 4 are not limited thereto.

The storage unit 411 is an exemplary "second storage unit". The storage unit 411 stores one or more license files that are issued by the license management server 4. For example, it is possible to represent the license file in the mode illustrated in FIG. 10; however, in this example, the license files that are issued by the multiple license management servers 4, respectively, are defined in different forms.

The license file request receiver 412 is an exemplary "second request information receiver". The license file request receiver 412 receives the above-described license file request (information that contains a license key and that requests a license file containing the license key) from the MFP 1.

The license file transmitter 413 is an exemplary "use authority information transmitter". The license file transmitter 413 transmits a license file that contains the license key contained in the license file request received by the license file request receiver 412, to the MFP 1. More specifically, the license file transmitter 413 specifies, among the license files stored in the storage unit 411, a license file that contains the license key contained in the license file request received by the license file request receiver 412. The license file transmitter 413 then transmits the specified license file to the MFP 1 as a response to the license file request.

The above-described functions of the license management server 4 (the license file request receiver 412 and the license file transmitter 413) are implemented by the CPU 301 executing programs that are stored in, for example, the ROM 302. Alternatively, at least part of the functions of the license management server 4 may be implemented with a dedicated hardware circuit (such as a semiconductor integrated circuit). The above-described storage unit 411 may be implemented with, for example, the ROM 302.

Figure 18:
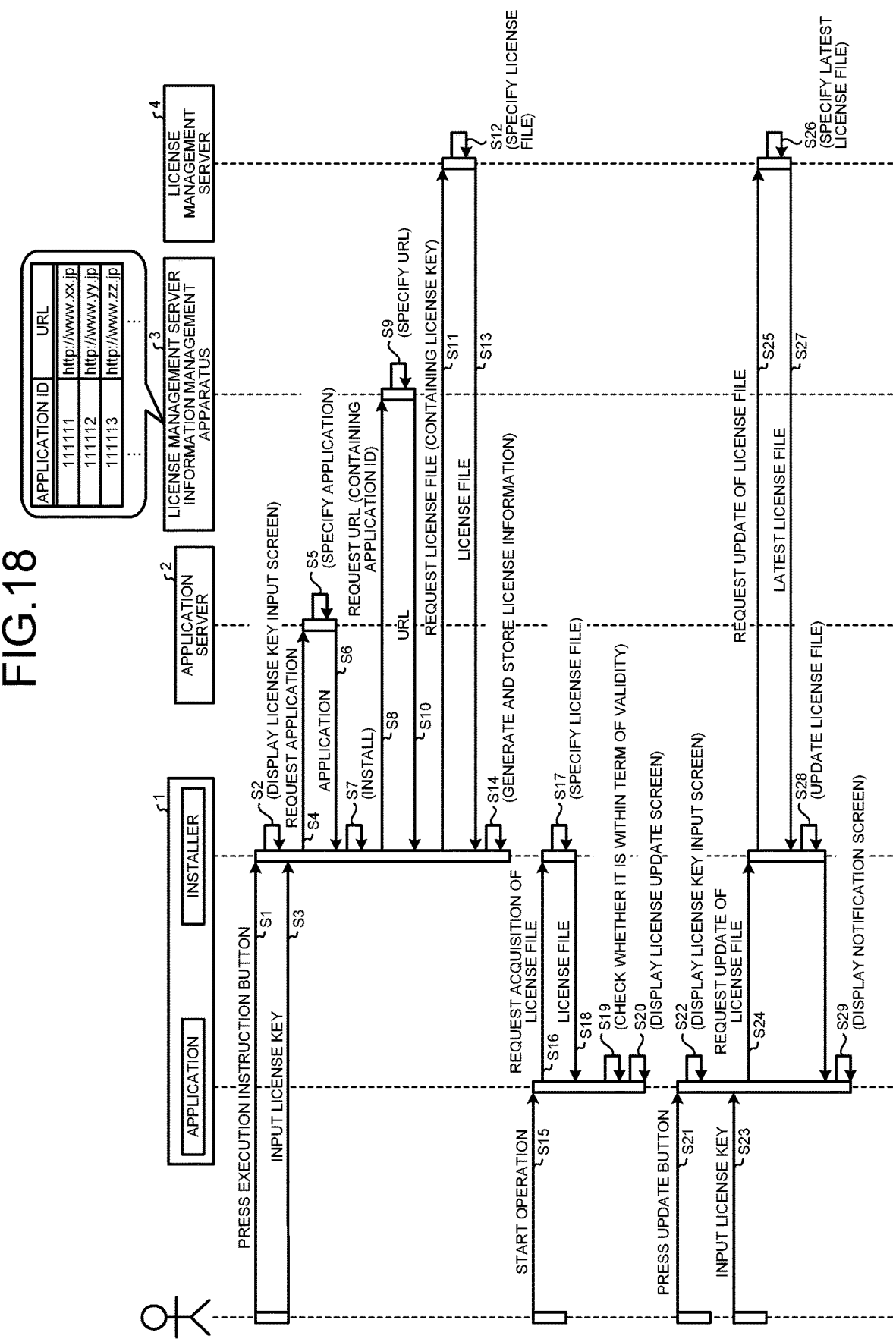
FIG. 18 is a sequence chart of an exemplary procedure of operations of an information processing system.

FIG. 18 is a sequence chart of an exemplary procedure of operations of the information processing system 100 of the present embodiment. It is assumed that the installation screen (see FIG. 8) of any one application chosen from the application list screen is displayed on the operation panel 27 of the MFP 1. In this example, in a case of a free application, a license key corresponding to the application (a license key common to free applications) is written in XML information that creates an application list screen; therefore, once the installation button 7 of the free application is pressed, the browser application is able to notify the OS of the operation unit 20 of command information obtained by adding information that contains the license key corresponding to the application and that represents that the application is a free application to the installation command attached to the installation button 7. On the other hand, in a case of a paid application, a license key corresponding to the application is not written in XML information that creates an application list screen; therefore, when the installation button 7 for the paid application is pressed, the browser application is able to notify the OS of the operation unit 20 of the command information obtained by adding information representing that the application is a paid application to the installation command attached to the installation button 7. The OS of the operation unit 20 broadcasts the command information to each application of the operation unit 20 and the installer responses to the installation command contained in the broadcasted command information. With reference to the notified command information, the installer is able to check whether the application to be installed is a paid application or a free application.

A case where any one application chosen from the application list screen is a paid application will be exemplified below. It is assumed that the license key corresponding to the application to be installed in the MFP 1 is known in advance. For example, the manager of an application may notify a user who purchases the application of a license key by post or by e-mail.

When the user presses the above-described execution instruction button 41 that is displayed on the installation screen (step S1), the installer (installation control unit 115) displays a screen inducing an input of a license key (such as the screen illustrated in FIG. 12) on the operation panel 27 before installation of the chosen application is executed (step S2). The user performs an operation of inputting a license key from the screen (step S3).

Figure 19:
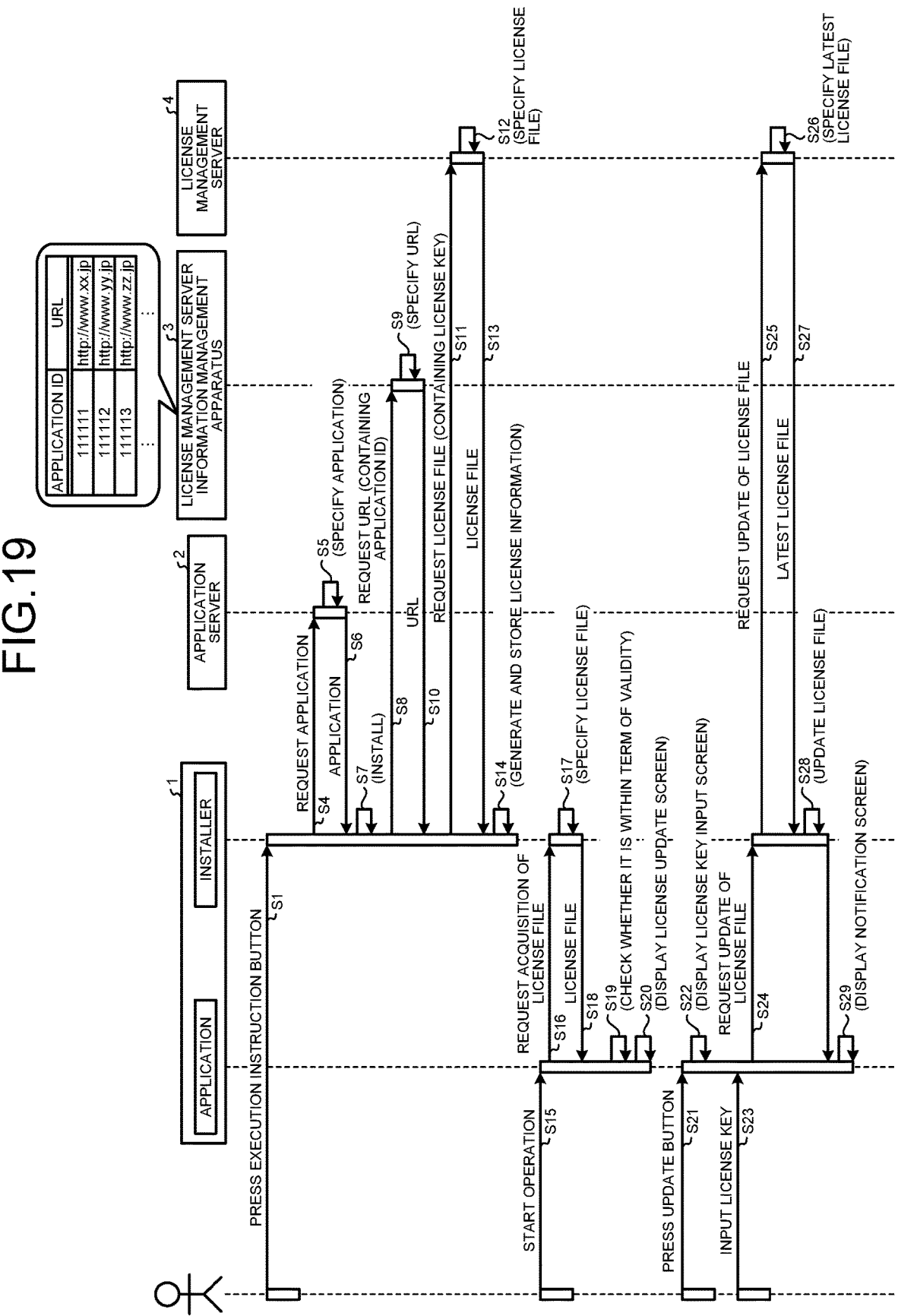
FIG. 19 is a sequence chart of another exemplary procedure of operations of the information processing system.

When, for example, any one application chosen from the application list screen is a free application, as described above, the installer is able to know a license key of the free application and it is unnecessary to display a screen inducing an input of a license key. In short, in this case, step S2 and step S3 that are described above are omitted as illustrated in FIG. 19.

FIG. 18 will be referred back to continue the description. After the input of the license key is accepted, the installer (the installation control unit 115) transmits the above-described application request, which requests the application that is identified by the application ID contained in the installation command, to the application server 2 (step S4). The application server 2 having received the application request specifies the application that is identified by the application ID contained in the received application request among the applications held by the application holding unit 213 (step S5). The application server 2 then transmits the application specified at step S5 to the MFP 1 (step S6).

The installer (the installation control unit 115) having received the application from the application server 2 performs control to install the received application as a response to the application request (step S7). The installer (the URL request transmitter 131) then transmits the above-described URL request containing the application ID of the application that is installed at step S7 to the license management server information management apparatus 3 (step S8). The license management server information management apparatus 3 having received the URL request refers to the URL information that is stored in the storage unit 311 and specifies the URL associated with the application ID contained in the received URL request (step S9). The license management server information management apparatus 3 then transmits the URL specified at step S9 as a response to the URL request (step S10).

The installer (the license file request transmitter 141) having received the URL as the response to the URL request from the license management server information management apparatus 3 transmits the above-described license file request, which requests the license file containing the license key whose input is accepted at step S3, as a response to the license file request to the license management server 4 that is specified by the received URL (step S11). The license management server 4 having received the license file request specifies the license file containing the license key contained in the received license file request among the license files stored in the storage unit 411 (step S12). The license management server 4 then transmits the license file, which is specified at step S12, as a response to the license file request to the MFP 1 (step S13).

After the license file is received from the license management server 4 as a response to the license file request, the installer generates license information in which the application ID of the application that is installed at step S7, the received license file, and the URL received at step S10 are associated with one another and stores the license information in the storage unit 118 (step S14).

When the user then performs an operation of starting the application that is installed at step S7 (which may be referred to as the "already-installed application" below) (for example, an operation of pressing a corresponding icon on the operation screen) (step S15), the already-installed application requests the installer to acquire the license file of the application (step S16). In this example, the request contains at least the application ID. The installer that accepts the request refers to the license information stored in the storage unit 118 and specifies a license file that is associated with the application ID contained in the request (step S17). The installer then transmits the license file that is specified at step S17 to the requesting already-installed application (step S18).

The already-installed application (the update control unit 120) having received the license file from the installer checks whether the current time is out of the term represented by the validity-term information contained in the received license file (step S19). When the current time is within the term of validity, the process performed by the already-installed application is executed. The case where the term of validity is over will be exemplified. In this case, the already-installed application (the update control unit 120) performs control to display the above-described license update screen on the operation panel 27 (step S20).

When the user presses the update button 121 (see FIG. 11) that is displayed on the license update screen (step S21), the already-installed application (the update control unit 120) performs control to display the above-described license key input screen on the operation panel 27 (step S22).

Once the user inputs the license key (the license key corresponding to the already-installed application that is started at step S15) on the license update screen (step S23), the already-installed application (the update control unit 120) transmits the above-described license file update request containing the input license key to the installer (step S24) and the installer transmits the license file update request to the license management server 4 (step S25).

The license management server 4 having received the license update request specifies a license file (the latest license file) containing the license key, which is contained in the received license file update request, among the license files that are stored in the storage unit 411 (step S26). The license management server 4 then transmits the latest license file, which is specified at step S26, as a response to the license file update request to the MFP 1 (step S27).

The installer (the update control unit 120) having received the latest license file as a response to the license file update request from the license management server 4 updates the license file to be updated (the license file of the application started at step S15), which is contained in the license information stored in the storage unit 118, to the latest license file that is received as a response to the license file update request from the license management server 4 (step S28) and notifies the already-installed application of the fact. The already-installed application that is notified of the fact displays a screen of a notification indicating that the update of the license file completes on the operation panel 27 (step S29).

Note that, in this example, the function of the update control unit 120 is provided by the already-installed application and the installer. Alternatively, the function of the update control unit 120 may be provided by only the installer. In this case, the processes at step S19, step S20, and step S22 are executed by the installer.

Figure 20:
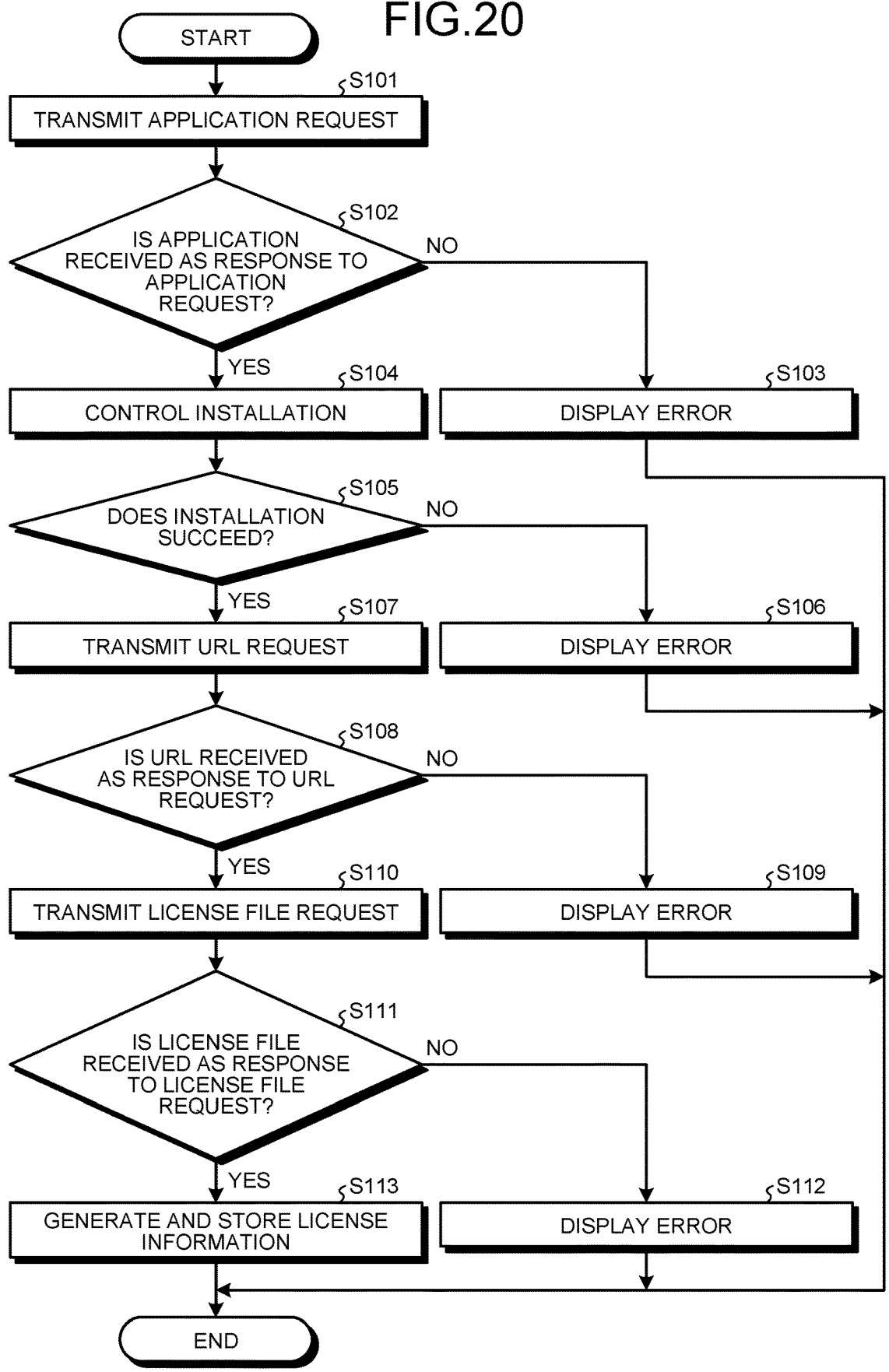
FIG. 20 is a flowchart of exemplary operations of the MFP.

FIG. 20 is a flowchart of exemplary operations of the MFP 1 performed when the above-described execution instruction button 41 that is displayed on the installation screen of any one application chosen from the application list screen is pressed. The specific content of each step is as already described with respect to the configuration and the sequence and therefore detailed descriptions thereof will be omitted as appropriate.

As illustrated in FIG. 20, first of all, the MFP 1 (installer) transmits the above-described application request to the application server 2 (step S101). When the MFP 1 does not receive any application as a response to the application request, which is transmitted at step S101, from the application server 2 (NO at step S102), i.e., fails in downloading the application that is identified by the application ID contained in the installation command attached to the pressed installation button 7, the MFP 1 (installer) displays a screen that displays an error on the operation panel 27 (step S103).

On the other hand, when the MFP 1 receives an application as a response to the application request form the application server 2 (YES at step S102), i.e., succeeds in downloading the application that is identified by the application ID contained in the installation command attached to the pressed installation button 7, the MFP 1 (installer) performs control to install the received application (step S104).

When the installation at step S104 fails in the installation (NO at step S105), the MFP 1 (installer) displays a screen displaying the error on the operation panel 27 (step S106). When the installation at step S104 succeeds (YES at step S105), the MFP 1 transmits the above-described URL request to the license management server information management apparatus 3 (step S107).

When the MFP 1 does not receive any URL as a response to the URL request, which is transmitted at step S107, from the license management server information management apparatus 3 (NO at step S108), the MFP 1 (installer) displays a screen displaying the error on the operation panel 27 (step S109). Upon receiving the URL as a response to the URL request, which is transmitted at step S107, from the license management server information management apparatus 3 (YES at step S108), the MFP 1 (installer) transmits the above-described license file request to the license management server 4 that is specified by the received URL (step S110).

When the MFP 1 does not receive any license file as a response to the license file request, which is transmitted at step S110, from the license management server 4 (NO at step S111), the MFP 1 (installer) displays a screen displaying the error on the operation panel 27 (step S112). When the MFP 1 receives the license file as a response to the license file request, which is transmitted at step S110, from the license management server 4 (YES at step S111), the MFP 1 (installer) generates license information in which the application ID of the application whose installation succeeds at step S105, the license file received from the license management server 4 at step S11, and the URL received at step S108 are associated with one another and stores the license information in the storage unit 118 (step S113).

Figure 21:
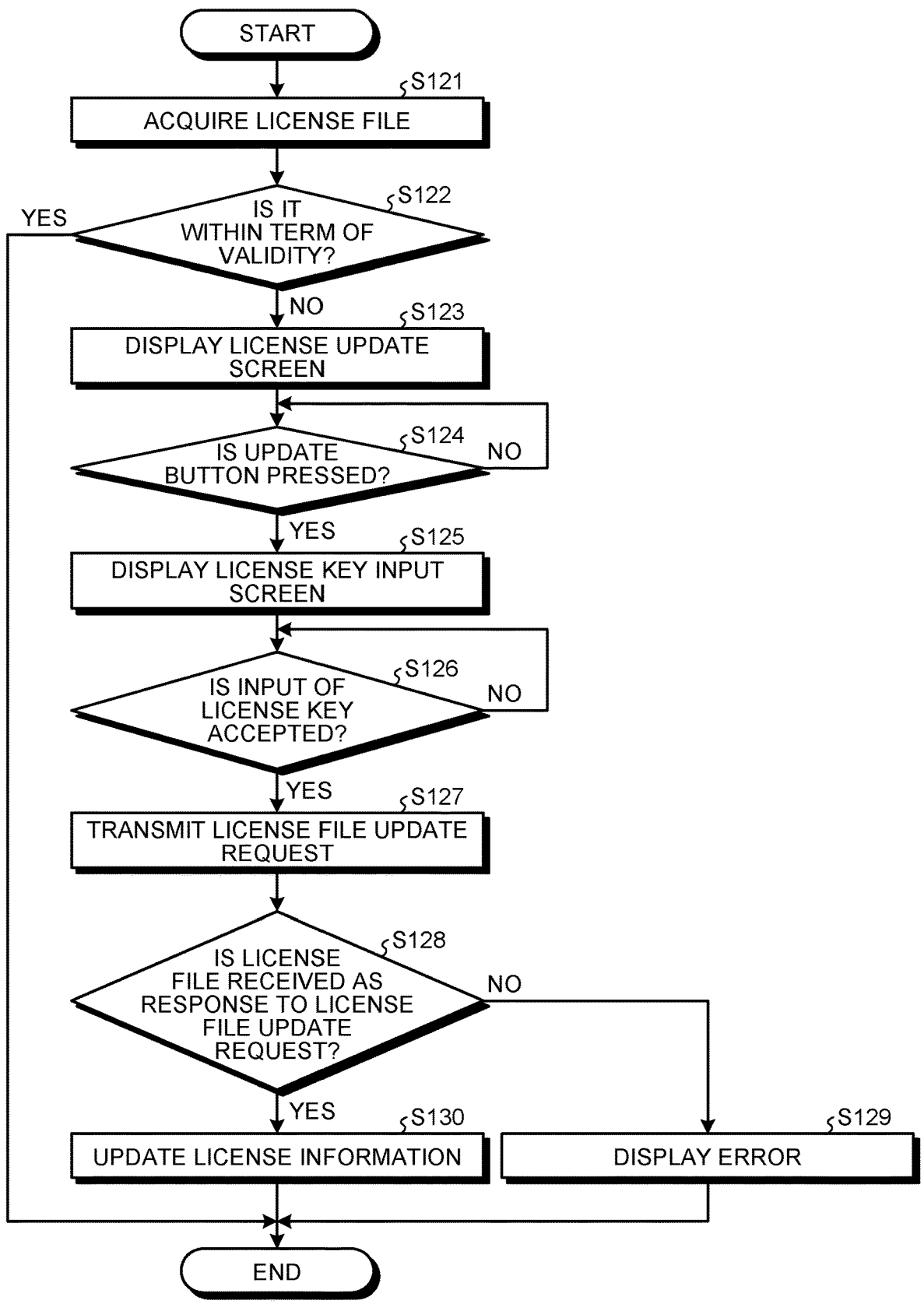
FIG. 21 is a flowchart of exemplary operations of the MFP.

FIG. 21 is a flowchart of exemplary operations of the MFP 1 performed when any one of applications already installed in the MFP 1 is started. The specific content of each step is the same as described with respect to the above-described configuration and sequence and therefore detailed descriptions thereof will be omitted as appropriate below.

As illustrated in FIG. 21, an application that is started (referred to as the "started application" below for convenience of descriptions) acquires the license file of the application from the installer (step S121). The started application then checks whether the current time is within the term represented by the validity-term information that is contained in the license file acquired at step S121 (step S122). When the result at step S122 is positive (YES at step S122), the started application continues the process. When the result at step S122 is negative (NO at step S122), the started application displays the above-described license update screen on the operation panel 27 (step S123).

When pressing the update button 121 displayed on the license update screen is accepted (YES at step S124), the start application displays the above-described license key input screen on the operation panel 27 (step S125). Upon accepting an input of the license key, the started application transmits the above-described license file update request to the license management server 4 via the installer (step S127). For example, when acquiring the license file at step S121, the started application is able to acquire, from the installer, the URL contained in the license information containing the application ID that identifies the started application. Accordingly, the started application is able to specify the license management server 4 to which the license file update request us to be transmitted.

When the MFP 1 (installer) does not receive any license file as a response to the license file update request from the license management server 4 (NO at step S128), the MFP 1 displays a screen displaying the error on the operation panel 27 (step S129). Upon receiving the license file as a response to the license file update request, which is transmitted at step S127 from the license management server 4 (YES at step S128), the MFP 1 (installer) updates the license file to be update (the license file contained in the license information of the started application) that is stored in the storage unit 118 to the license file that is received from the license management server 4 at step S128 (step S130).

As described above, in the present embodiment, after installing an application, the MFP 1 transmits a URL request that contains the application ID of the installed application and that requests the URL of the license management server 4 (second server) that issues the license information of the installed application to the license management server information management apparatus (first server) having the URL information in which the application ID and the URL of the license management server 4 are associated with each other. The MFP 1 then receives the URL associated with the application ID contained in the URL request from the license management server information management apparatus 3. Accordingly, even when the sources of issue of pieces of license information on multiple applications installed in the MFP 1 differ from one another, it is possible to specify the license management server 4 from which the license information on each application is issued.

Each license management server 4 holds a license file containing a license key. The MFP 1 transmits a license file request that contains the license key corresponding to the installed application and that requires the license file containing the license key, to the license management server 4 that is specified by the URL received from the license management server information management apparatus 3. The MFP 1 then receives the license file containing the license key contained in the license file request as a response to the license file request from the license management server 4. Accordingly, it is possible to manage the license information in which at least the application ID of the installed application and the license file received from the license management server 4 are associated with each other. Accordingly, even when the sources of issue of pieces of license information on installed multiple applications differ from one another, it is possible to manage the pieces of license information collectively.

The present embodiment of the present invention has been described; however, the present invention is not limited thereto. The components may be modified to embody the invention within the scope of the invention when carried out. Various inventions can be formed by appropriately combining multiple components from the components disclosed in the present embodiment. For example, some components may be deleted from the all components represented in the present embodiment.

(1) Modification 1

Figure 22:
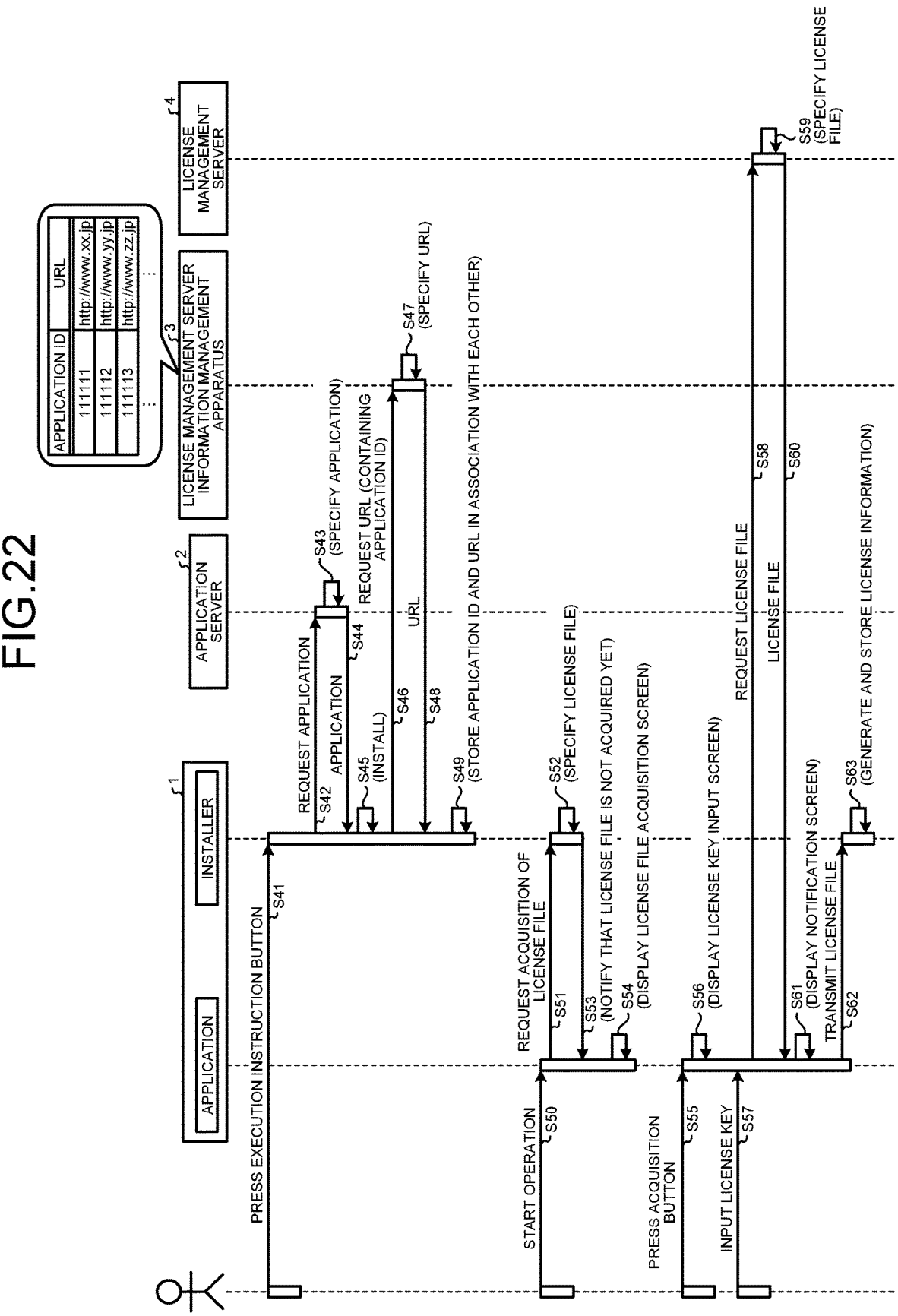
FIG. 22 is a sequence chart of an exemplary procedure of operations of an information processing system of a modification.

For example, in the present embodiment, once a new application is installed in the MFP 1, the MFP 1 executes a process of acquiring the license file of the application (which may be considered as an activation process for causing a state in which it is possible to use the function of the application). Alternatively, the MFP 1 may be configured not to perform the activation process immediately after the installation and to perform the activation process when the installed application is started for the first time. FIG. 22 is a sequence chart of an exemplary procedure of operations of the information processing system 100 of Modification 1. It is assumed that the installation screen of any one application chosen from the above-described application list screen is displayed on the operation panel 27 of the MFP 1. The content of the processes at steps S41 to step S48 illustrated in FIG. 22 is same as the content of the processes at steps S4 to S10 and therefore detailed descriptions thereof will be omitted.

After step S48, the installer stores the application ID of the application that is installed at step S45 and the URL that is received from the license management server information management apparatus 3 at step S48 in association with each other in the storage unit 118 (step S49).

Thereafter, when the user performs an operation of starting the application installed at step S46 (which may be referred to as the "already-installed application") (step S50), the already-installed application requests the installer to acquire the license file of the application (step S51). In this example, the request contains at least the application ID. The installer that receives the request refers to the license information stored in the storage unit 118 and specifies the license file associated with the application ID contained in the request (step S52). In this example, because the license file of the application installed at step S46 is not acquired yet, the installer notifies the application that the license file is not acquired yet (step S53). Here, the installer notifies the application of the URL associated with the application ID of the application.

Figure 23:
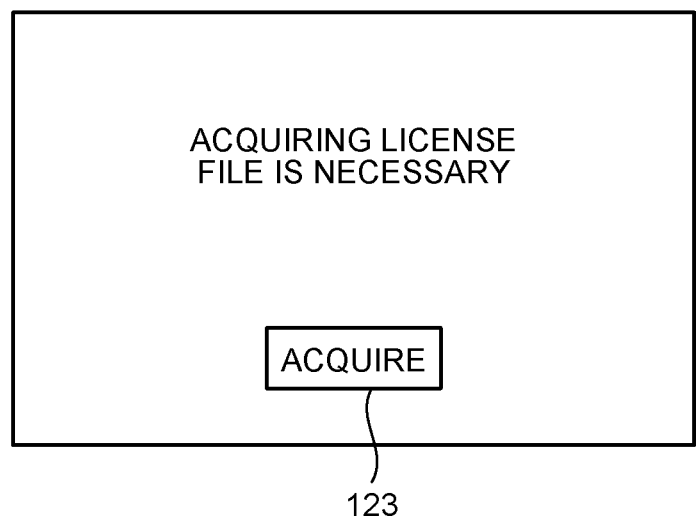
FIG. 23 is a diagram of an exemplary license file acquisition screen.

The already-installed application that receives the above-described notification from the installer displays a license file acquisition screen that accepts an instruction to acquire the license file on the operation panel 27 (step S54). FIG. 23 is a diagram of an exemplary license file acquisition screen. In the example illustrated in FIG. 23, an acquisition button 123 for accepting an instruction to acquire the license file is displayed on the license file acquisition screen.

The description of FIG. 22 will be continued. When the user presses the acquisition button 123 (see FIG. 23) that is displayed on the license file acquisition screen (step S55), the already-installed application displays a screen inducing an input of a license key (like the screen illustrated in FIG. 12) on the operation panel 27 (step S56). The user then performs an operation of inputting the license key from the screen (step S57). After accepting an input of the license key, the already-installed application transmits the above-described license file request requesting the license file containing the license key whose input is accepted to the license management server 4 that is specified by the URL notified from the installer at step S54 (step S58). The license management server 4 that receives the license file request specifies the license file containing the license key contained in the received license file request among the license files stored in the storage unit 411 (step S59). The license management server 4 then transmits the license file specified at step S59 as a response to the license file request to the MFP 1 (step S60).

The already-installed application having received the license file as a response to the license file request from the license management server 4 displays a screen of a notification indicating that acquisition of the license file completes on the operation panel 27 (step S61). After step S61, the already-installed application transmits the license file, which is received from the license management server 4, to the installer (step S62). The installer generates license information in which the application ID of the application installed at step S45, the license file received at step S62, and the URL received at step S48 are associated with one another and stores the license information in the storage unit 118 (step S63).

In short, in Modification 1, it can be considered that the function of the license file acquisition unit 117 of the MFP 1 is provided not by the installer but by the already-installed application.

Modification 2

Figure 24:
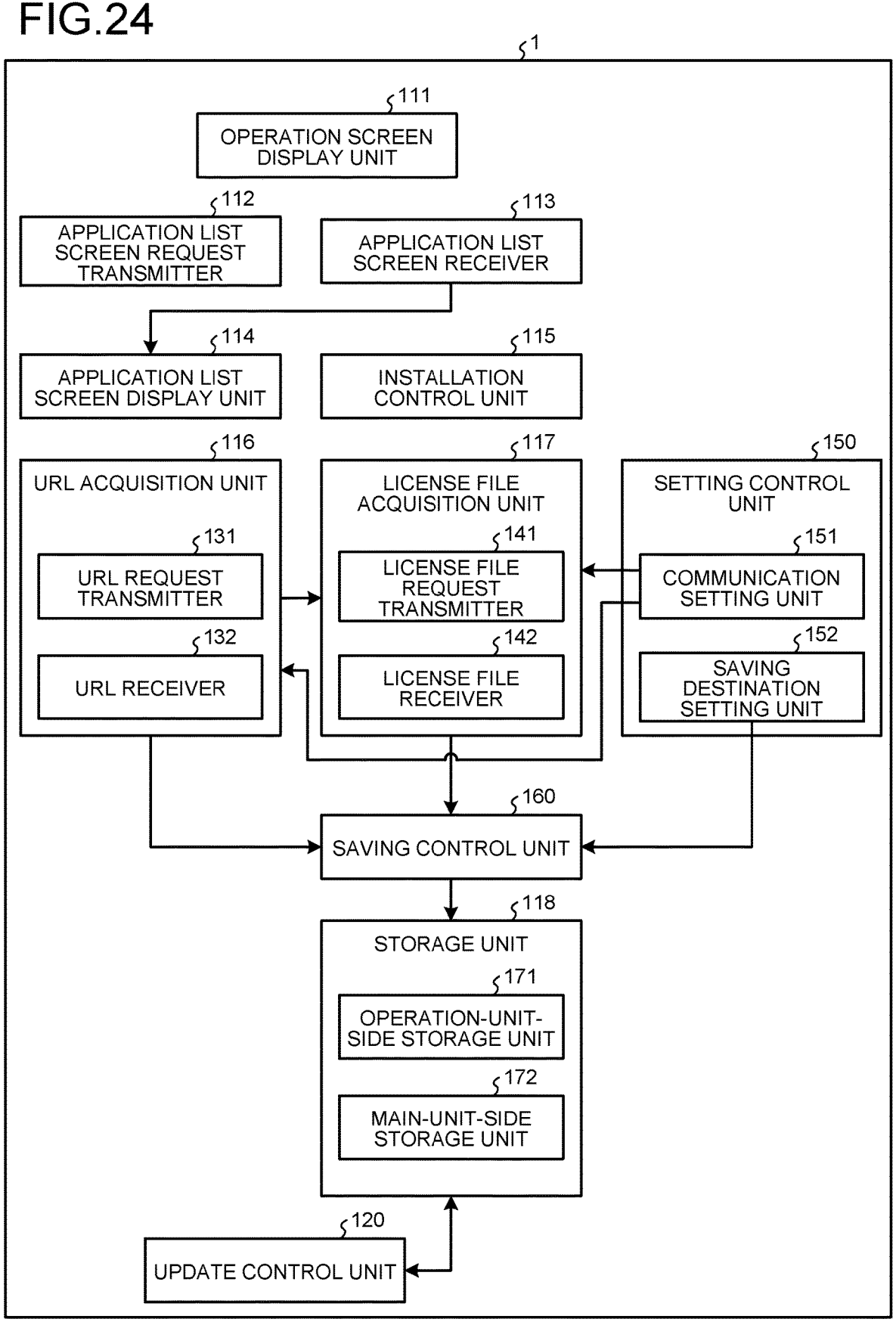
FIG. 24 is a diagram of exemplary functions of a MFP of another modification.

FIG. 24 is a diagram of exemplary functions of the MFP 1 of Modification 2. As illustrated in FIG. 24, the MFP 1 further includes a setting control unit 150 and a saving control unit 140. In Modification 2, the storage unit 118 includes an operation-unit-side storage unit 171 of the operation unit 20 and a main-unit-side storage unit 172 of the main unit 10. The operation-unit-side storage unit 171 includes, for example, a flash memory 24 and the main-unit-side storage unit 172 includes, for example, the HDD 14.

The setting control unit 150 includes a communication setting unit 151 and a saving destination setting unit 152. The communication setting unit 151 makes a setting on which one of the communication I/F 15 of the main unit 10 and the communication I/F 25 of the operation unit 20 is used for a connection to each of the license management server information management apparatus 3 and the license management server 4 according to an instruction of the user. In short, it can be considered that a method of communicating with each of the license management server information management apparatus 3 and the license management server 4 is set. The URL acquisition unit 116 (installer) communicates with the license management server information management apparatus 3 using any one of the communication I/F 15 of the main unit 10 and the communication I/F 25 of the operation unit 20 according to the setting made by the communication setting unit 151. In the same manner, the license file acquisition unit 117 (installer) communicates with the license management server 4 by using any one of the communication I/F 15 of the main unit 10 and the communication I/F 25 of the operation unit 20 according to the setting made by the communication setting unit 151.

Figure 25:
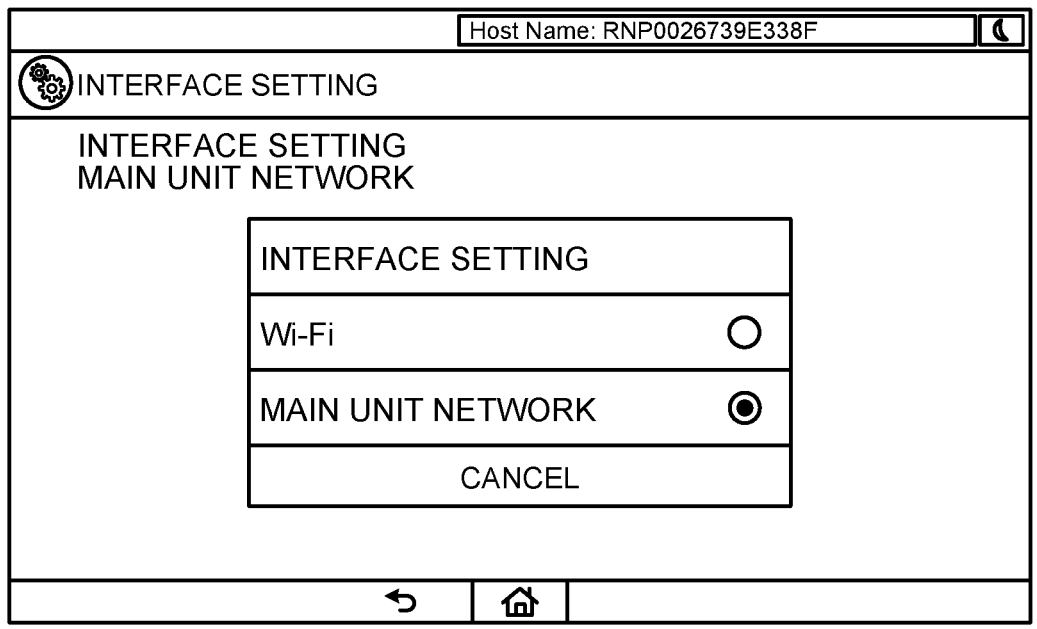
FIG. 25 is a diagram of an exemplary default communication setting screen.

Upon accepting an operation of calling a communication setting screen for making a communication setting from the user, the communication setting unit 151 performs control to display a default communication setting screen like as illustrated in FIG. 25 on the operation panel 27. The communication setting screen displays radio buttons for selecting, as a communication interface setting, any one of "Wi-Fi (trademark)" corresponding to the communication I/F 25 of the operation unit 20 and "main unit network" corresponding to the communication I/F 15 of the main unit 10. The communication I/F 25 of the operation unit 20 is an interface for performing wireless communications according to the Wi-Fi standard; however, the communication I/F 25 is not limited thereto.

Figure 26:
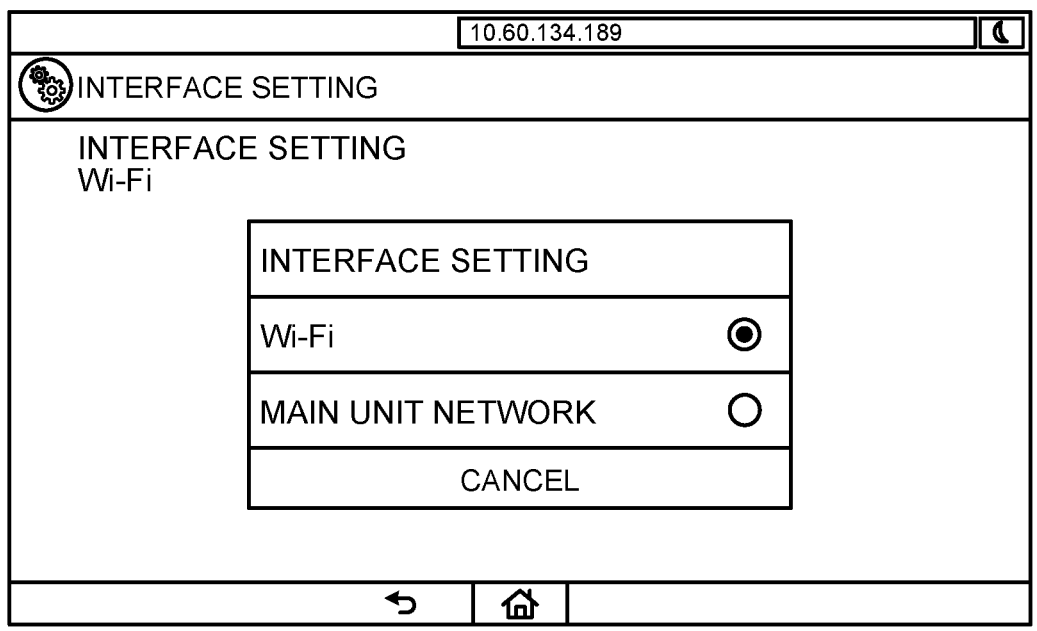
FIG. 26 is a diagram illustrating a transition of a communication setting screen.

In the example illustrated in FIG. 25 (on the default communication setting screen), "main unit network" is chosen. For example, when the user performs an operation of choosing "Wi-Fi" from the default communication setting screen, the choice of "main unit network" is canceled as illustrated in FIG. 26.

FIG. 24 will be referred back to continue the description. The saving destination setting unit 152 sets at least any one of the operation unit 20 and the main unit 10 as a destination in which the above-described license information (second correspondence information) is to be saved. More specifically, the saving destination setting unit 152 sets, in accordance with an instruction from the user, at least any one of the operation-unit-side storage unit 171 and the main-unit-side storage unit 172 as the destination in which the license information is to be saved. In this example, after the setting made using the communication setting screen is completed, the saving destination setting unit 152 performs control to display the saving destination setting screen for setting the destination in which the license information is to be saved on the operation panel 27; however, what induces the display of the saving destination setting screen is not limited thereto. For example, a mode may be employed where, upon accepting a given operation (an operation of calling the saving destination setting screen) from the user, the saving destination setting unit 152 performs control to display the saving destination setting screen.

Figure 27:
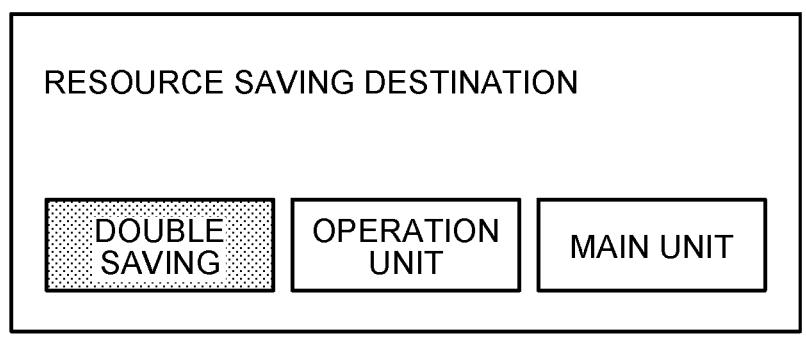
FIG. 27 is a diagram of an exemplary default saving destination setting screen.
Figure 28:
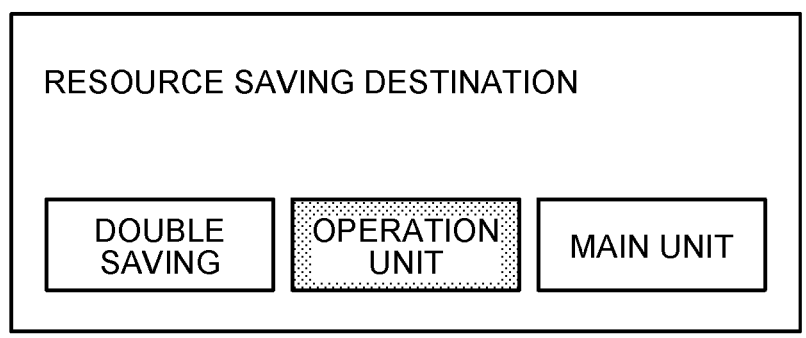
FIG. 28 is a diagram illustrating a transition of the saving destination setting screen.
Figure 29:
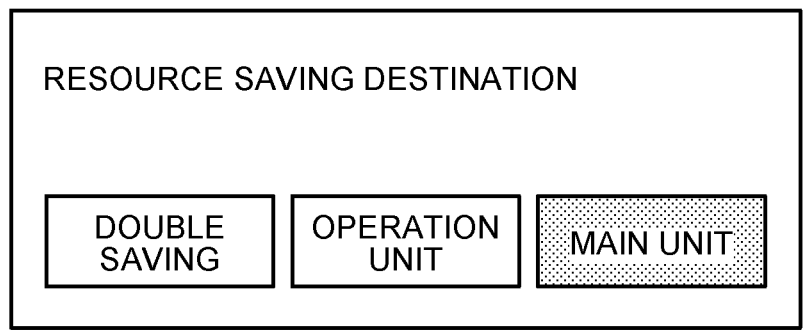
FIG. 29 is a diagram illustrating a transition of the saving destination setting screen.

FIG. 27 is a diagram of an exemplary default saving destination setting screen. In this example, the saving destination setting screen displays radio buttons for choosing, as the destination in which a resource (the above-described license information) is to be saved, any one of "double saving" corresponding to both the operation unit 20 and the main unit 10, "operation unit" corresponding to the operation unit 20, and "main unit" corresponding to the main unit 10. On the default saving destination setting screen, "double saving" is chosen. For example, when the user performs an operation of choosing "operation unit" from the default saving destinations setting screen, the choice of "double saving" is canceled and only "operation unit" is chosen as illustrated in FIG. 28. For example, when the user performs an operation of choosing "main unit" from the default saving destination setting screen, the choice of "double saving" is canceled and only "main unit" is chosen as illustrated in FIG. 29.

Figure 30:
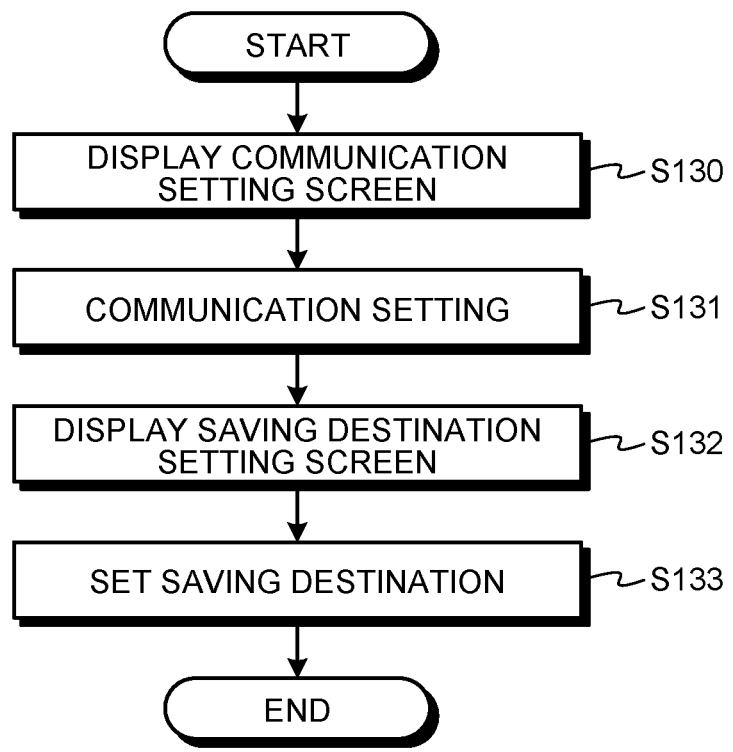
FIG. 30 is a flowchart of exemplary operations of a setting control unit.

FIG. 30 is a flowchart of exemplary operations of the setting control unit 150. As illustrated in FIG. 30, upon accepting an operation of calling the communication setting screen from the user, first of all, the communication setting unit 151 performs control to display the default communication setting screen like as illustrated in FIG. 25 on the operation panel 27 (step S130). The communication setting unit 151 then sets a method of communicating with each of the license management server information management apparatus 3 and the license management server 4 (step S131). The saving destination setting unit 152 then performs control to display the default saving destination setting screen on the operation panel 27 (step S132). The saving destination setting unit 152 then sets the destination in which the license information is to be saved, in accordance with an instruction of the user (step S133).

FIG. 24 will be referred back to continue the description. The saving control unit 160 performs control to save the above-described license information (second correspondence information) in accordance with the setting made by the saving destination setting unit 152. More specifically, when the saving destination setting unit 152 sets any one of the operation-unit-side storage unit 171 and the main-unit-side storage unit 172 as the destination in which the license information is to be saved, the saving control unit 160 performs control to save the license information in any one of the operation-unit-side storage unit 171 and the main-unit-side storage unit 172 that is set as the destination. When the saving destination setting unit 152 sets both the operation-unit-side storage unit 171 and the main-unit-side storage unit 172 as the destination in which the license information is to be saved, the saving control unit 160 performs control to save the license information in each of the operation-unit-side storage unit 171 and the main-unit-side storage unit 172 (double saving).

FIG. 31 is a sequence chart of an exemplary procedure of operations of the information processing system 100 of Modification 2. The content of the processes at steps S71 to step S77 illustrated in FIG. 31 is same as the content of the processs at steps S1 to S7 illustrated in FIG. 18 and therefore detailed descriptions thereof will be omitted. At step S78 after step S77 illustrated in FIG. 31, the installer checks the setting (communication setting) made by the communication setting unit 151. A case will be exemplified where the communication setting unit 151 sets "main network" (a setting is made to connect to each of the license management server information management apparatus 3 and the license management server 4 using the communication I/F 15 of the main unit 10). The installer (the URL request transmitter 131) requests the communication I/F 15 of the main unit 10 to transmit the above-described URL request containing the application ID of the application that is installed at step S77 to the license management server information management apparatus 3 (step S79) and the communication I/F 15 that receives the request transmits the URL request to the license management server information management apparatus 3 (step S80). The license management server information management apparatus 3 having received the URL request refers to the URL information stored in the storage unit 311 and specifies the URL associated with the application ID contained in the received URL request (step S81). The license management server information management apparatus 3 then transmits the URL, which is specified at step S81, as a response to the URL request to the MFP 1 (step S82). Upon receiving the URL from the license management server information management apparatus 3, the communication I/F 15 of the main unit 10 transmits the received URL to the installer (step S83).

The installer having received the URL (the license file request transmitter 141) requests the communication I/F 15 of the main unit 10 to transmit the above-described license file request that contains the license key whose input is accepted at step S73 and that requests the license file, to the license management server 4 specified by the received URL (step S84) and the communication I/F 15 that receives this request transmits the license file request to the license management server 4 (step S85). The license management server 4 having received the license file request specifies the license file containing the license key contained in the received license file request among the license files stored in the storage unit 411 (step S86). The license management server 4 then transmits the license file specified at step S86 to the MFP 1 as a response to the license file request (step S87).

Upon receiving the license file from the license management server 4, the communication I/F 15 of the main unit 10 transmits the received license file to the installer (step S88). The installer (the saving control unit 160) generates license information in which the application ID of the application that is installed at step S77, the license file that is received at step S88, and the URL that is received at step S83 are associated with one another (step S89).

The installer (saving control unit 160) checks the setting made by the saving destination setting unit 152 (saving destination setting) (step S90). Each of the case where "double saving" is set, the case where the operation unit 20 is set as the saving destination, and the case where the main unit 10 is set as the saving destination will be described below.

First of all, the case where "double saving" is set will be described. In this case, the installer (the saving control unit 160) performs control to save the license information in the operation-unit-side storage unit 171 (step S91) and saves the license information also in the main-unit-side storage unit 172 (step S92). The case where "operation unit" is set as the saving destination will be described. In this case, the installer (the saving control unit 160) performs control to save the license information in the operation-unit-side storage unit 171 (step S93). The case where "main unit" is set as the saving destination will be described. In this case, the installer (the saving control unit 160) performs control to save the license information in the main-unit-side storage unit 172 (step S94).

FIG. 32 is a sequence chart of an exemplary procedure of operations performed when the communication setting unit 151 sets "Wi-Fi" (a setting is made to connect to each of the license management server information management apparatus 3 and the license management server 4 using the communication I/F 25 of the operation unit 20). The content of the processes at steps S201 to step S207 is same as the content of the processes at steps S71 to S77 illustrated in FIG. 31. At step S208 after step S207, the installer checks the setting (communication setting) made by the communication setting unit 151. As described above, the communication setting sets "Wi-Fi" here. The installer (the URL request transmitter 131) requests the communication I/F 25 of the operation unit 20 to transmit the above-described URL request containing the application ID of the application, which is installed at step S207, to the license management server information management apparatus 3 (step S209). The communication I/F 25 that receives this request transmits the URL request to the license management server information management apparatus 3 (step S210). The license management server information management apparatus 3 having received the URL request refers to the URL information that is stored in the storage unit 311 and specifies the URL that is associated with the application ID contained in the received URL request (step S211). Then the license management server information management apparatus 3 transmits the URL, which is specified at step S211, to the MFP 1 as a response to the URL request (step S212). Upon receiving the URL from the license management server information management apparatus 3, the communication I/F 25 of the operation unit 20 transmits the received URL to the installer (step S213).

The installer having received the URL (the license file request transmitter 141) requests the communication I/F 25 of the operation unit 20 to transmit the above-described license file request, which requests the license file containing the license key whose input is accepted at step S203, to the license management server 4 that is specified by the received URL (step S214). The communication I/F 25 having accepted the request transmits the license file request to the license management server 4 (step S215). The license management server 4 having received the license file request specifies the license file containing the license key contained in the received license file request among the license files stored in the storage unit 411 (step S216). The license management server 4 then transmits the license file, which is specified at step S216, as a response to the license file request to the MFP 1 (step S217). Upon receiving the license file from the license management server 4, the communication I/F 25 of the operation unit 20 transmits the received license file to the installer (step S218).

The content of the processes at steps S219 to step S224 is same as the content of the processes at steps S89 to S94 illustrated in FIG. 31 and therefore detailed descriptions thereof will be omitted. The configuration of Modification 2 may be applied to the Modification 1 described above.

The programs executed by the information processing system 100 of the embodiments (including the MFP 1, the application server 2, the license management server information management apparatus 3, and the license management server 4) may be configured to be recorded in a computer-readable recording medium, such as a CD-ROM, a flexible disk (FD), a CD-R, a digital versatile disk (DVD), or a universal serial bus (USB), in a file in an installable or an executable form and provided, or may be configured to be provided or distributed via a network, such as the Internet. Alternatively, various programs may be configured to be incorporated in, for example, a ROM and provided.

According to an embodiment, even when the sources of issue of pieces of license information of multiple applications that are installed in the information processing apparatus differ from one another, it is possible to manage the pieces of license information collectively.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system comprising:
an information processing apparatus;
a first server; and
one or more second servers configured to manage authority to use different applications,
the information processing apparatus, the first server, and the one or more second servers being connected to one another via a network,
the first server comprising:
a first memory to store first correspondence information in which application identifying information that identifies each application and server specifying information that specifies a second server configured to manage authority to use the application are associated with each other; and
at least one first processor configured to execute computer readable instructions to
receive first request information that contains application identifying information identifying a specific application and that requests the server specifying information that specifies a second server configured to manage authority to use the specific application, from the information processing apparatus, and transmit the server specifying information that is associated with the application identifying information contained in the first request information received by the first request information receiver, to the information processing apparatus, the second server comprising:

a second memory to store one or more pieces of use authority information that each contain use authority authentication information for authenticating the use authority and that represents information on the use authority; and at least one second processor configured to execute computer readable instructions to receive second request information that contains the use authority authentication information and that requests the use authority information containing the use authority authentication information, from the information processing apparatus, and transmit the use authority information that contains the use authority authentication information contained in the second request information received by the second request information receiver, to the information processing apparatus, the information processing apparatus comprising:

at least one third processor configured to execute computer readable instructions to transmit the first request information containing the application identifying information that identifies an already-installed application, to the first server, receive the server specifying information from the first server as a response to the first request information, transmit the second request information containing the use authority authentication information corresponding to the already-installed application to the second server that is specified by the server specifying information received by the server specifying information receiver, and receive the use authority information from the second server as a response to the second request information; and a third memory to store second correspondence information in which the application identifying information that identifies the already-installed application and the use authority information received by the use authority information receiver are associated with each other, wherein the at least one third processor is configured not to perform the transmit the first request information immediately after complete installation of the already-installed application and to perform the transmit the first request information when the already-installed application is started for the first time.

2. The information processing system according to claim 1, wherein the second correspondence information is information in which the application identifying information, the use authority information, and the server specifying information that is received by the at least one third processor are associated with one another.

3. The information processing system according to claim 1, wherein the use authority information contains at least validity-term information representing a term during which it is possible to use the application, and the at least one third processor is further configured to perform control to update the use authority information if a time at which the already-installed application is started is out of the term represented by the validity-term information contained in the use authority information associated with the application identifying information that identifies the application.

4. The information processing system according to claim 3, wherein the at least one third processor is further configured to perform control to display a first screen on which an instruction to update the use authority information is accepted.

5. The information processing system according to claim 4, wherein the at least one third processor is further configured to perform control to display a second screen on which an input of use authority authentication information is accepted, if the instruction to update the use authority information on the first screen is accepted, transmit third request information that contains the accepted use authority authentication information and that requests an update of the use authority information, to the second server, if the input of the use authority authentication information on the second screen is accepted, and update the use authority information to be updated that is stored in the third memory to the use authority information that is received from the second server as a response to the third request information.

6. The information processing system according to claim 1, further comprises a third server, wherein the third server comprises:

at least one fourth processor configured to execute computer readable instructions to hold an application list screen on which each of the one or more applications is associated with an installation command that represents a command to install the application; and transmit the application list screen to the information processing apparatus as a response to an application list screen request that requests the application list screen from the information processing apparatus, and wherein the at least one third processor is further configured to transmit the application list screen request to the third server;

receive the application list screen from the third server;

perform control to display the application list screen that is received by the application list screen receiver; and perform control to install an application that is chosen by a user from among the applications that are contained in the application list screen.

7. The information processing system according to claim 1, wherein the information processing apparatus further comprises:

a user interface configured to accept an operation; and a main body configured to operate according to the operation accepted by the user interface.

8. The information processing system according to claim 7, wherein the at least one third processor is further configured to set at least any one of the user interface and the main body as a destination in which the second correspondence information is to be saved; and perform control to save the second correspondence information according to a setting made by the at least one third processor.

9. The information processing system according to claim 8, wherein
the third memory includes a user-interface-side memory of the user interface and a main-body-side memory of the main body,
the at least one third processor is further configured to
perform control to save the second correspondence information in any one that is set, of the user-interface-side memory and the main-body-side memory if the at least one third processor sets any one of the user-interface-side memory and the main-body-side memory as the destination in which the second correspondence information is to be saved, and
perform control to save the second correspondence information in each of the user-interface-side memory and the main-body-side memory, if the at least one third processor sets both the user-interface-side memory and the main-body-side memory as the destination in which the second correspondence information is to be saved.

10. The information processing system according to claim 9, wherein, the at least one third processor is further configured to set at least any one of the user-interface-side memory and the main-body-side memory as the destination in which the second correspondence information is to be saved, according to an instruction of a user.

11. The information processing system according to claim 1, wherein the one or more second servers is a plurality of second servers.

12. The information processing system according to claim 1, wherein the information processing system is an image forming apparatus, the image forming apparatus includes:
an operation unit including a first processor and a first memory, and configured to provide a user interface; and
a main unit including a second processor; a second memory, and an image forming engine, and configured to receive an instruction from the operation unit and provide an image forming function, and
the first processor is configured to display a setting screen for allowing setting for whether to store a license file in the first memory of the operation unit, the second memory of the main unit, or the both.

13. The information processing system according to claim 12, wherein the license file is acquired into the operation unit through the main unit from the server, and
the license file acquired into the operation unit is stored in the main unit and/or the operation unit in accordance with the setting.

14. The information processing system of claim 1 wherein, before the receiving first request information that contains application identifying information identifying a specific application and before the requesting the server specifying information that specifies a second server configured to manage authority to use the specific application, from the information processing apparatus,
performing an operation of starting the already-installed application.

15. An information processing method performed by an information processing apparatus that is connected to a first server and one or more second servers configured to manage authority to use different applications, via a network, the information processing method comprising:
transmitting first request information that contains application identifying information that identifies an already-installed application and that requests server specifying information that specifies a second server configured to manage authority to use the already-installed application, to the first server having first correspondence information in which application identifying information that identifies each application and server specifying information that specifies a second server configured to manage authority to use the application are associated with each other;
receiving the server specifying information that is associated with the application identifying information which is contained in the first request information, from the first server as a response to the first request information;
transmitting second request information that contains use authority authentication information corresponding to the already-installed application and that requests use authority information, to the second server that is specified by the server specifying information received at the receiving the server specifying information, and that has one or more pieces of use authority information that each contain use authority authentication information for authenticating the use authority and that represents information on the use authority;
receiving the use authority information from the second server as a response to the second request information; and
storing second correspondence information in which the application identifying information that identifies the already-installed application and the use authority information received at the receiving the use authority information are associated with each other, in a memory;
wherein the transmitting the second request information is not performed immediately after complete installation of the already-installed application and is performed when the already-installed application is started for the first time.

16. An information processing method performed by an information processing system that includes the information processing apparatus, the first server and the one or more second servers, the information processing method including the information processing method according to claim 15, and further comprising:
by the first server,
receiving the first request information that contains the application identifying information that identifies the application and that requests the server specifying information that specifies the second server, from the information processing apparatus;
referring to first correspondence information that is stored in a first memory, and in which the application identifying information and the server specifying information are associated with each other, and transmitting the server specifying information that is associated with the application identifying information contained in the first request information received at the receiving the first request information, to the information processing apparatus;
by the second server,
receiving the second request information that contains the use authority authentication information for authenticating the use authority and that requests the use authority information representing information on the use authority, from the information processing apparatus;
transmitting the use authority information that contains the use authority authentication information contained in the second request information received at the receiving the second request information, from among one or more pieces of use authority information stored in a second memory configured to store the one or more pieces of use authority information, to the information processing apparatus.

17. A non-transitory recording medium including a computer program causing a computer of the information processing apparatus to perform the information processing method according to claim 15.

18. The information processing method according to claim 15, wherein the one or more second servers is a plurality of second servers.

19. An information processing apparatus that is connected to a first server and one or more second servers configured to manage authority to use different applications, via a network, the information processing apparatus comprising:
   at least one processor configured to execute computer readable instructions to
   transmit first request information that contains application identifying information that identifies an already-installed application and that requests server specifying information that specifies a second server configured to manage authority to use the already-installed application, to the first server having first correspondence information in which the application identifying information that identifies each application and the server specifying information that specifies a second server configured to manage authority to use the application are associated with each other,
   receive the server specifying information that is contained in the first request information and associated with the application identifying information, from the first server as a response to the first request information,
   transmit second request information that contains use authority authentication information corresponding to the already-installed application and that requests use authority information, to the second server that is specified by the server specifying information received by the server specifying information receiver and that has one or more pieces of use authority information that each contain use authority authentication information for authenticating the use authority and that represents information on the use authority, and
   receive the use authority information from the second server as a response to the second request information; and
   a third memory to store second correspondence information in which the application identifying information that identifies the already-installed application and the use authority information received by the use authority information receiver are associated with each other;
   wherein the at least one processor is configured not to perform the transmit the second request information immediately after complete installation of the already-installed application and to perform the transmit the second request information when the already-installed application is started for the first time.

20. The information processing apparatus according to claim 19, wherein the one or more second servers is a plurality of second servers.

* * * * *